US007246012B2

(12) United States Patent
Kutsyy et al.

(10) Patent No.: US 7,246,012 B2
(45) Date of Patent: Jul. 17, 2007

(54) CHARACTERIZING BIOLOGICAL STIMULI BY RESPONSE CURVES

(75) Inventors: Vadim Kutsyy, Los Altos, CA (US); Daniel A. Coleman, San Mateo, CA (US); Eugeni A. Vaisberg, Foster City, CA (US)

(73) Assignee: Cytokinetics, Inc., South San Francisco, CA (US)

( * ) Notice: Subject to any disclaimer, the term of this patent is extended or adjusted under 35 U.S.C. 154(b) by 165 days.

(21) Appl. No.: 10/892,450

(22) Filed: Jul. 16, 2004

(65) Prior Publication Data

US 2005/0137806 A1 Jun. 23, 2005

Related U.S. Application Data

(60) Provisional application No. 60/509,040, filed on Jul. 18, 2003.

(51) Int. Cl.
*G06K 9/00* (2006.01)
*G01N 33/48* (2006.01)

(52) U.S. Cl. .................. 702/19; 382/128; 382/133; 435/6

(58) Field of Classification Search .................. None
See application file for complete search history.

(56) References Cited

U.S. PATENT DOCUMENTS

| 4,818,710 | A | 4/1989 | Sutherland et al. |
|---|---|---|---|
| 4,922,092 | A | 5/1990 | Rushbrooke et al. |
| 4,959,301 | A | 9/1990 | Weaver et al. |
| 4,965,725 | A | 10/1990 | Rutenberg |
| 5,162,990 | A | 11/1992 | Odeyale et al. |
| RE34,214 | E | 4/1993 | Carlsson et al. |
| 5,287,272 | A | 2/1994 | Rutenberg et al. |
| 5,326,691 | A | 7/1994 | Hozier |
| 5,355,215 | A | 10/1994 | Schroeder et al. |
| 5,526,258 | A | 6/1996 | Bacus |
| 5,548,661 | A | 8/1996 | Price et al. |
| 5,655,028 | A | 8/1997 | Soll et al. |
| 5,733,721 | A | 3/1998 | Hemstreet, III et al. |
| 5,741,648 | A | 4/1998 | Hemstreet, III et al. |
| 5,768,412 | A | 6/1998 | Mitsuyama et al. |
| 5,776,748 | A | 7/1998 | Singhvi et al. |
| 5,777,888 | A | 7/1998 | Rine et al. |
| 5,790,692 | A | 8/1998 | Price et al. |
| 5,790,710 | A | 8/1998 | Price et al. |
| 5,804,436 | A | 9/1998 | Okun et al. |
| 5,856,665 | A | 1/1999 | Price et al. |
| 5,893,095 | A | 4/1999 | Jain et al. |
| 5,919,646 | A | 7/1999 | Okun et al. |
| 5,932,872 | A | 8/1999 | Price |
| 5,962,250 | A | 10/1999 | Gavin et al. |
| 5,976,825 | A | 11/1999 | Hochman |
| 5,989,835 | A | 11/1999 | Dunlay et al. |
| 5,991,028 | A | 11/1999 | Cabib et al. |
| 5,995,143 | A | 11/1999 | Price et al. |
| 6,007,996 | A | 12/1999 | McNamara et al. |
| 6,008,010 | A | 12/1999 | Greenberger et al. |
| 6,083,763 | A | 7/2000 | Balch |
| 6,103,479 | A | 8/2000 | Taylor |
| 6,146,830 | A | 11/2000 | Friend et al. |
| 6,169,816 | B1 | 1/2001 | Ravkin |
| 6,222,093 | B1 | 4/2001 | Marton et al. |
| 6,345,115 | B1 | 2/2002 | Ramm et al. |
| 6,518,035 | B1 | 2/2003 | Ashby et al. |
| 6,599,694 | B2 | 7/2003 | Elias |
| 6,615,141 | B1 | 9/2003 | Sabry et al. |
| 6,631,331 | B1 | 10/2003 | Sabry et al. |
| 6,651,008 | B1 | 11/2003 | Vaisberg et al. |
| 6,658,143 | B2 | 12/2003 | Hansen et al. |
| 6,738,716 | B1 | 5/2004 | Sabry et al. |
| 6,743,576 | B1 | 6/2004 | Sabry et al. |
| 6,936,012 | B2 * | 8/2005 | Wells .................. 600/554 |
| 2002/0049544 | A1 | 4/2002 | Nislow et al. |
| 2002/0119441 | A1 | 8/2002 | Elias |
| 2002/0141631 | A1 | 10/2002 | Vaisberg et al. |
| 2002/0154798 | A1 | 10/2002 | Cong et al. |
| 2003/0228565 | A1 | 12/2003 | Oestreicher et al. |

FOREIGN PATENT DOCUMENTS

EP 0 468 705 A2 1/1992

(Continued)

OTHER PUBLICATIONS

Adams et al. "Cell Patterning on Glass and Polymeric Substrates," U.S. Appl. No. 60/138,119, filed Jun. 7, 1999.

(Continued)

*Primary Examiner*—John Brusca
*Assistant Examiner*—Jason Sims
(74) *Attorney, Agent, or Firm*—Finnegan, Henderson, Farabow, Garrett & Dunner, L.L.P.

(57) ABSTRACT

A method for calculating distances between stimulus response curves (e.g., dose response curves) allows classification of stimuli. The response curves show how the phenotype of one or more cells changes in response to varying levels of the stimulus. Each "point" on the curve represents quantitative phenotype or signature for cell(s) at a particular level of stimulus (e.g., dose of a therapeutic). The signatures are multivariate phenotypic representations of the cell(s). They include various features of the cell(s) obtained by image analysis. To facilitate the comparison of stimuli, distances between points on the response curves are calculated. First, the response curves may be aligned on a coordinate representing a separate distance, r, from a common point of negative control (e.g., the point where no stimulus is applied). Integration on r may be used to compute the distance between two response curves. The distance between response curves is used to classify stimuli.

16 Claims, 9 Drawing Sheets

FOREIGN PATENT DOCUMENTS

| | | |
|---|---|---|
| EP | 0 317 139 B1 | 11/1995 |
| EP | 0 902 394 A1 | 3/1999 |
| WO | WO 87/02802 A1 | 5/1987 |
| WO | WO 93/21511 A1 | 10/1993 |
| WO | WO 94/11841 A1 | 5/1994 |
| WO | WO 95/10036 A2 | 4/1995 |
| WO | WO 95/22749 A3 | 8/1995 |
| WO | WO 96/01438 A1 | 1/1996 |
| WO | WO 96/09605 A1 | 3/1996 |
| WO | WO 97/11094 A1 | 3/1997 |
| WO | WO 97/20198 A2 | 6/1997 |
| WO | WO 97/40055 A1 | 10/1997 |
| WO | WO 97/43732 A1 | 11/1997 |
| WO | WO 97/45730 A1 | 12/1997 |
| WO | WO 98/05959 A1 | 2/1998 |
| WO | WO 98/35256 A1 | 8/1998 |
| WO | WO 98/38490 A1 | 9/1998 |
| WO | WO 98/44333 A1 | 10/1998 |
| WO | WO 98/45704 A2 | 10/1998 |
| WO | WO 98/52018 A1 | 11/1998 |
| WO | WO 99/05323 A1 | 2/1999 |
| WO | WO 99/08091 A1 | 2/1999 |
| WO | WO 99/17116 A1 | 4/1999 |
| WO | WO 99/39184 A1 | 8/1999 |
| WO | WO 99/44062 A1 | 9/1999 |
| WO | WO 99/54494 A2 | 10/1999 |
| WO | WO 99/67739 A1 | 12/1999 |
| WO | WO 00/03246 A2 | 1/2000 |
| WO | WO 00/06774 A1 | 2/2000 |
| WO | WO 00/17624 A2 | 3/2000 |
| WO | WO 00/17643 A2 | 3/2000 |
| WO | WO 00/17808 A1 | 3/2000 |
| WO | WO 00/26408 A2 | 5/2000 |
| WO | WO 00/29984 A2 | 5/2000 |
| WO | WO 00/31534 A1 | 6/2000 |
| WO | WO 00/33250 A2 | 6/2000 |
| WO | WO 00/43820 A1 | 7/2000 |
| WO | WO 00/49540 A1 | 8/2000 |
| WO | WO 00/50872 A2 | 8/2000 |
| WO | WO 00/60356 A1 | 10/2000 |
| WO | WO 00/65472 A1 | 11/2000 |
| WO | WO 00/70528 A3 | 11/2000 |
| WO | WO 01/35072 A2 | 5/2001 |
| WO | WO 01/81895 A2 | 11/2001 |
| WO | WO 02/000940 A3 | 1/2002 |
| WO | WO 02/05012 A2 | 6/2002 |
| WO | WO 02/05012 A3 | 6/2002 |
| WO | WO 02/47032 A1 | 6/2002 |
| WO | WO 02/50512 A2 | 6/2002 |
| WO | WO 02/066961 A1 | 8/2002 |
| WO | WO 02/067182 A2 | 8/2002 |
| WO | WO 02/067182 A3 | 8/2002 |
| WO | WO 02/067188 A3 | 8/2002 |
| WO | WO 02/067195 A2 | 8/2002 |
| WO | WO 02/067195 A3 | 8/2002 |

OTHER PUBLICATIONS

Amacher et al., "Tetracycline-Induced Steatosis in Primary Canine Hepatocyte Cultures," *Fund. Appl. Toxicol.* 40: 256-263 (1997).

Amacher, D. E., "A toxicologist's guide to biomarkers of hepatic response," *Human & Experimental Toxicol.* 21: 253-262 (2002).

Ancin et al., "Advances in Automated 3-D Image Analysis of Cell Populations Imaged by Confocal Microscopy," *Cytometry* 25: 221-234 (1996).

Baraona et al. "Alcoholic Hepatomegaly: Accumulation of Protein in the Liver," *Science* 190: 794-795 (1975).

Blankenstein et al., "Modular concept of a laboratory on a chip for chemical and biochemical analysis," *Biosensors & Bioelectronics* 13(3-4): 427-438 (1998).

Blom et al., "Regional loss of the mitochondrial membrane potential in the hepatocyte is rapidly followed by externalization of phosphatidyl serines at that specific site during apoptosis," JBC Papers in Press, Manuscript M201264200, published Jan. 21, 2003.

Boland et al., "Automated Recognition of Patterns Characteristic of Subcellular Structures in Fluorescence Microscopy Images," *Cytometry* 33: 366-375 (1998).

Boyce et al. "Data Management and Presentation Methods," U.S. Appl. No. 60/142,375, filed Jul. 6, 1999.

Boyce et al. "System and Method to Achieve Integrated Presentation of Summary Statistics, Detail Measurements, and Raw Images While Maintaining Efficient Use of Storage Media Through Separation of the Data in an Integrated Data Management and Presentation System," U.S. Appl. No. 60/108,291, filed Nov. 13, 1998.

Cormack et al., "FACS-optimized mutants of the green fluorescent protein (GFP)," *Gene.* 173: 33-38 (1996).

Craig, Elizabeth and Gross, Carol, "Is hsp70 the cellular thermometer?," *TIBS* 16: 135-140 (1991).

Cseke, I., "A Fast Segmentation Scheme For White Blood Cell Images," *Pattern Recognition, 1992. vol. III. Conference C: Image, Speech and Signal Analysis, Proceedings* 530-533.

Cubitt et al., "Understanding, improving and using fluorescent proteins,"*TIBS* 20: 448-455 (1995).

Dobson et al., "Dynamics of insulin-stimulated translocation of GLUT4 in single living cells visualised using green fluorescent protein," *FEBS Letters* 393: 179-184 .

Dunlay et al. "Data Management and Presentation Methods," U.S. Appl. No. 60/140,240, filed Jun. 21, 1999.

Fowler et al. "Application of Nile Red, a Fluorescent Hydrophobic Probe, for the Detection of Neutral Lipid Deposits in Tissue Sections: Comparison with Oil Red O[1]" *J. of Histochem. and Cytochem.* 33(8): 833-836 (1985).

Georget et al., "Trafficking of the androgen receptor in living cells with fused green fluorescent protein—androgen receptor," *Molecular and Cellular Endocrinology* 129: 17-26 (1997).

Giuliano et al., "High-Content Screening: A New Approach to Easing Key Bottlenecks in the Drug Discovery Process," *J. Biomolecular Screening* 2(4): 249-259 (1997).

Giuliano et al., "Fluorescent-Protein Biosensors: New Tools for Drug Discovery," *Trends in Biotechnology* 16(3): 135-140 (1998).

Greenspan et al. "Nile Red: A Selective Fluorescent Stain for Intracellular Lipid Droplets," *J. Cell Biology* 100: 965-973 (1985).

Hartwell et al., "Integrating Genetic Approaches Into The Discovery of Anticancer Drugs," *Science* 278(7): 1064-1068 (1997).

Hofland et al., "Role of tumor-derived fibroblasts in the growth of primary cultures of human breast-cancer cells: effects of epidermal growth factor and the somatostatin analogue octreotide," *Int. J. Cancer* 60: 93-99 (1995).

Kapur et al. "Design and Fabrication of Spatially Controlled Miniaturized Organ Systems from Stem Cells," U.S. Appl. No. 60/127,339, filed Apr. 1, 1999.

Kobayashi et al. "Prevention of Acute Liver Failure in Rats with Reversibly Immortalized Human Hepatocytes," *Science* 287: 1258-1262 (2000).

Lieber, Charles S. "Alcohol and the Liver: Metabolism of Alcohol and its Role in Hepatic and Extrahepatic Diseases," *The Mount Sinai J. of Med.* 67(1): 84-94 (2000).

Lippincottt-Schwartz, Jennifer and Smith, Carolyn L., "Insights into secretory and endocytic membrane traffic using green fluorescent protein chimeras," *Current Opinion in Neurobiology* 7: 631-639 (1997).

Lu et al., "Hierarchical Shape Recognition Using Polygon Approximation and Dynamic Alignment," *Acoustics, Speech, and Signal Processing* 2: 976-979 (1988).

Malpica et al., "Applying Watershed Algorithms to the Segmentation of Clustered Nuclei," *Cytometry* 28: 289-297 (1997).

McMillian et al. "Nile Red Binding to HepG2 Cells: An Improved Assay for In Vitro Studies of Hepatosteatosis," *In Vitro & Molecular Toxicology* 14(3): 177-190 (2001).

Misteli, Tom and Spector, David L., "Applications of the green fluorescent protein in cell biology and biotechnology," *Nature Biotechnology* 15: 961-964 (1997).

Montironi et al., "Computed Cell Cycle and DNA Histogram Analyses in Image Cytometry in Breast Cancer," *J. Clin. Pathol.* 46: 795-800 (1993).

Ng et al., "Evaluating Multi-Dimensional Indexing Structures For Images Transformed by Principal Component Analysis," *Proceedings of SPIE* 2670: 50-61 (1996).

Nilsson et al. "Segmentation of Dense Leukocyte Clusters," *IEEE Workshop on Mathematical Methods in Biomedical Image Analysis*, Kauai, Hawaii, 221-227 (2001).

Palm et al., "The structural basis for spectral variations in green fluorescent protein," *Nature Structural Biology* 4(5): 361-365 (1997).

Pauwels et al., "Combination of Computerized Morphonuclear and Multivariate Analyses to Characterize In Vitro the Antineoplastic Effect of Alkylating Agents," *J. Pharmacol. and Toxicol. Methods* 33(1): 35-45 (1995).

Pauwels et al., "Determination of the Mechanism of Action of Anticancer Drugs by Means of the Computer-Assisted Microscope Image Analysis of Feulgen-Stained Nuclei," *J. Pharmacol. Toxicol. Methods* 37: 105-115 (1997).

Pauwels et al., "In Vitro Digital Cell Image Analysis of Morphonuclear Modifications Induced by Natural DNA-Interacting Anticancer Drugs in Three Neoplastic Cell Lines," *Meth. Find. Exp. Clin. Pharmacol* 17(3): 151-162 (1995).

Pauwels et al., "Monitoring Of Chemotherapy-Induced Morphonuclear Modifications By Means Of Digital Cell-Image Analysis," *J. Cancer Res. Clin. Oncol.* 119: 533-540 (1993).

Pauwels et al., "The Application of Computerized Analysis of Nuclear Images and Multivariate Analysis to the Understanding of the Effects of Antineoplastic Agents and Their Mechanism of Action," *Meth. Find. Exp. Clin. Pharmacol* 15(2): 113-124 (1993).

Printout from Automated Cell Website (www.automatedcell.com) printed on Mar. 9, 2001, 24 Pages.

Printout from Q3DM Website (www.Q3DM.com), printed on Mar. 1, 2001, 30 Pages.

Rubas et al., "An Integrated Method to Determine Epithelial Transport and Bioactivity of Oral Drug Candidates in Vitro," *Pharma. Research* 13(1): 23-26 (1996).

Russ, J.C., "Processing Bionary Images," *The Image Processing Handbook*, 2$^{nd}$ Edition, Publishers—CRC Press, Inc., pp. 457-474 (1995).

Sakai et al., "Purification and characterization of N-acyl-D-glutamate deacylase from *Alcaligenes xylosoxydans* subsp. *xylosoxydans* A-6," *FEBS Letters* 289(1): 44-46 (1991).

Schroder et al., "FLIPR: A New Instrument For Accurate, High Throughput Optical Screening," *Journal of Biomolecular Screening* 1(2): 75-80 (1996).

Serbouti et al., "Image Segmentation and Classification Methods to Detect Leukemias," *Annual Int'l Conf. of IEEE Eng. In Medicine & Biology Soc.* 13(1): 0260-0261 (1991).

Shulga et al., "In Vivo Nuclear Transport Kinetics in *Saccharomyces cerevisiae*: A Role for Heat Shock Protein 70 during Targeting and Translocation," *The Journal of Cell Biology* 135(2): 329-339 (1996).

Smith, Roger James "A Pulsed Polarimeter," U.S. Appl. No. 60/110,643, filed Dec. 1, 1998.

Stearns et al., "Interleukin 10 (IL-10) Inhibition of Primary Human Prostate Cell-induced Angiogenesis: IL-10 Stimulation of Tissue Inhibitor of Metalloproteinase-1 and Inhibition of Matrix Metalloproteinase (MMP)-2/MMP-9 Secretion," *Clin. Cancer Res.* 5: 189-196 (1999).

Sundblad et al., "The use of image analysis and automation for measuring mitotic index in apical conifer meristems," *J. of Experimental Botany* 49(327): 1749-1756 (1998).

Takayama et al., "Patterning cells and their environments using multiple laminar fluid flows in capillary networks," *Proc. Natl. Acad. Sci. USA* 96: 5545-5548 (1999).

Tarasova et al., "Visualization of G Protein-coupled Receptor Trafficking with the Aid of the Green Fluorescent Protein," *J. Biological Chem.* 272(23): 14817-14824 (1997).

Taylor et al., "Automated Interactive Microscopy: Measuring and Manipulating the Chemical and Molecular Dynamics of Cells and Tissues," *Progress in Biomedical Optics*, Conference in San Jose, California, Jan. 28-Feb. 1, 1996, vol. 2678: 15-27.

Thibault et al. "Actin filament alteration as a potential marker for cholestasis: a study in isolated rat hepatocyte couplets," *Toxicology* 73: 269-279 (1992).

Tuchweber et al., "Mechanisms of Experimentally Induced Intrahepatic Cholestasis," *Progress in Liver Diseases*, vol. VIII, Publishers—Grune & Stratton 161-178 (1986).

Uria et al., "Regulation of *Collagenase*-3 Expression in Human Breast Carcinomos Is Mediated by Stromal-Epithelial Cell Interactions," *Cancer Research* 57: 4882-4888 (1997).

Wang et al. "Database for Storage, Retrieval, and Analysis of Cellular Information," U.S. Appl. No. 60/120,801, filed Feb. 19, 1999.

Wang et al. "Immunolocalization of 6xHis-tagged proteins in CHO cells with anti-His antibodies," *Amer. Biotech. Laboratory*, Dec. 8-10, 1999.

Watanabe et al. "Phalloidin Alters Bile Canalicular in Primary Monolayer Cultures of Rat Liver," *Gastroenterology* 85(2): 245-253 (1983).

Weinstein et al., "An Information-Intensive Approach to the Molecular Pharmacology of Cancer," *Science* 275: 343-349 (1997).

Welsh, Stephen and Kay, Steve A., "Reporter gene expression for monitoring gene transfer," *Curr. Opin.Biotechnol.* 8(5): 617-622 (1997).

Zimmerman, H. J., "Expressions of Hepatotoxicity," *Hepatotoxicity: The Adverse Effects of Drugs and Other Chemicals on the Liver*, 2$^{nd}$ Edition, Publishers—Lippincott Williams & Wilkins 61-109 (1999).

Zimmerman, H. J., "Classification of Hepatotoxins and Mechanisms of Toxicity," *Hepatotoxicity: The Adverse Effects of Drugs and Other Chemicals on the Liver*, 2$^{nd}$ Edition, Publishers—Lippincott Williams & Wilkins 111-145 (1999).

Zimmerman, H. J., "Experimental Hepatotoxicity," *Hepatotoxicity: The Adverse Effects of Drugs and Other Chemicals on the Liver*, 2$^{nd}$ Edition, Publishers—Lippincott Williams & Wilkins 200-228 (1999).

Zimmerman, H. J., "Toxic Cholestasis," *Hepatotoxicity: The Adverse Effects of Drugs and Other Chemicals on the Liver*, 2$^{nd}$ Edition, Publishers—Lippincott Williams & Wilkins 295-323 (1999).

Vaisberg et al., "Classifying Cells Based on Information Contained in Cell Images," U.S. Appl. No. 09/729,754, filed Dec. 4, 2000.

Vaisberg et al., "Characterizing Biological Stimuli by Response Curves," U.S. Appl. No. 09/789,595, filed Feb. 20, 2001.

Vaisberg et al., "Image Analysis of the Golgi Complex," U.S. Appl. No. 09/792,012, filed Feb. 20, 2001.

Cong et al., "Extracting Shape Information Contained in Cell Images," U.S. Appl. No. 09/792,013, filed Feb. 20, 2001.

Kutsyy et al., "Methods and Apparatus for Investigating Side Effects," U.S. Appl. No. 10/621,821, filed Jul. 16, 2003.

Coleman et al., "Methods and Apparatus for Characterising Cells and Treatments," U.S. Appl. No. 10/615,116, filed Jul. 7, 2003.

Kutsyy et al., "Characterizing Biological Stimuli by Response Curves," U.S. Appl. No. 09/789,595, filed Feb. 20, 2001.

Boyce et al., "Data Management and Presentation Methods," U.S. Appl. No. 60/142,646, filed Jul. 6, 1999.

Sabry et al., "A Database Method for Predictive Cellular Bioinformatics," U.S. Appl. No. 09/310,879, filed May 14, 1999.

Office Action dated May 8, 2001, for U.S. Appl. No. 09/310,879, filed May 14, 1999.

Office Action dated Oct. 2, 2001, for U.S. Appl. No. 09/310,879, filed May 14, 1999.

Office Action dated Feb. 6, 2002, for U.S. Appl. No. 09/310,879, filed May 14, 1999.

Office Action dated Jul. 2, 2002, for U.S. Appl. No. 09/310,879, filed May 14, 1999.

Office Action dated Oct. 22, 2002, for U.S. Appl. No. 09/310,879, filed May 14, 1999.

Office Action dated Apr. 9, 2003, for U.S. Appl. No. 09/310,879, filed May 14, 1999.

Office Action dated Jun. 11, 2003, for U.S. Appl. No. 09/310,879, filed May 14, 1999.

Office Action dated Oct. 20, 2003, for U.S. Appl. No. 09/310,879, filed May 14, 1999.
Office Action dated Nov. 30, 2004, for U.S. Appl. No. 09/310,879, filed May 14, 1999.
Vaisberg et al., "A Database System Including Computer Code for Predictive Cellular Bioinformatics," U.S. Appl. No. 09/311,996, filed May 14, 1999.
Office Action dated Sep. 29, 2000, for U.S. Appl. No. 09/311,996, filed May 14, 1999.
Office Action dated Feb. 14, 2001, for U.S. Appl. No. 09/311,996, filed May 14, 1999.
Office Action dated Oct. 2, 2001, for U.S. Appl. No. 09/311,996, filed May 14, 1999.
Office Action dated Apr. 2, 2002, for U.S. Appl. No. 09/311,996, filed May 14, 1999.
Office Action dated Jul. 16, 2002, for U.S. Appl. No. 09/311,996, filed May 14, 1999.
Office Action dated Mar. 10, 2003, for U.S. Appl. No. 09/311,996, filed May 14, 1999.
Office Action dated Nov. 6, 2003, for U.S. Appl. No. 09/311,996, filed May 14, 1999.
Office Action dated May 10, 2004, for U.S. Appl. No. 09/311,996, filed May 14, 1999.
Office Action dated Sep. 24, 2004, for U.S. Appl. No. 09/311,996, filed May 14, 1999.
Adams et al., "A Database System and User Interface for Predictive Cellular Bioinformatics," U.S. Appl. No. 60/134,104, filed May 14, 1999.
Office Action dated Jan. 9, 2004, for U.S. Appl. No. 09/790,214, filed Feb. 20, 2001.
Office Action dated May 30, 2003, for U.S. Appl. No. 09/790,214, filed Feb. 20, 2001.
Office Action dated Jan. 16, 2003, for U.S. Appl. No. 09/790,214, filed Feb. 20, 2001.
Kutsyy et al., "Methods and Apparatus for Investigating Side Effects," U.S. Appl. No. 10/621,821, filed Jul. 16, 2003.
Coleman et al., "Methods and Apparatus for Characterising Cells and Treatments," U.S. Appl. No. 10/615,116, filed Jul. 7, 2003.
Sabry et al., "A Database Method for Predictive Cellular Bioinformatics," U.S. Appl. No. 09/718,151, filed Nov. 20, 2000.
Office Action dated Oct. 6, 2003, for U.S. Appl. No. 09/718,151, filed Nov. 20, 2000.
Office Action dated Jan. 27, 2003, for U.S. Appl. No. 09/718,151, filed Nov. 20, 2000.
Office Action dated Apr. 9, 2002, for U.S. Appl. No. 09/718,151, filed Nov. 20, 2000.
Office Action dated Nov. 6, 2001, for U.S. Appl. No. 09/718,151, filed Nov. 20, 2000.
Sabry et al., "A Database System for Predictive Cellular Bioinformatics," U.S. Appl. No. 09/718,666, filed Nov. 21, 2000.
Office Action dated Jan. 16, 2004, for U.S. Appl. No. 09/718,666, filed Nov. 21, 2000.
Office Action dated Aug. 12, 2003, for U.S. Appl. No. 09/718,666, filed Nov. 21, 2000.
Sabry et al., "A Database System for Predictive Cellular Bioinformatics," Substitute Specification for U.S. Appl. No. 09/718,666, filed Nov. 21, 2000.
Office Action dated May 9, 2002, for U.S. Appl. No. 09/718,666, filed Nov. 21, 2000.
Vaisberg et al., "A Database System Including Computer Code for Predictive Cellular Bioinformatics," U.S. Appl. No. 09/718,685, filed Nov. 21, 2000.
Office Action dated Jun. 15, 2004, for U.S. Appl. No. 09/718,685, filed Nov. 21, 2000.
Office Action dated Oct. 20, 2003, for U.S. Appl. No. 09/718,685, filed Nov. 21, 2000.
Office Action dated Jul. 18, 2003, for U.S. Appl. No. 09/718,685, filed Nov. 21, 2000.
Office Action dated May 14, 2003, for U.S. Appl. No. 09/718,685, filed Nov. 21, 2000.
Office Action dated Jul. 16, 2002, for U.S. Appl. No. 09/718,685, filed Nov. 21, 2000.
Office Action dated Mar. 12, 2002, for U.S. Appl. No. 09/718,685, filed Nov. 21, 2000.
Office Action dated Oct. 23, 2001, for U.S. Appl. No. 09/718,685, filed Nov. 21, 2000.
Office Action dated Dec. 9, 2004, for U.S. Appl. No. 09/888,063, filed Jun. 22, 2001.
Office Action dated Jun. 10, 2004, for U.S. Appl. No. 09/888,063, filed Jun. 22, 2001.
Office Action dated Jan. 14, 2004, for U.S. Appl. No. 09/888,063, filed Jun. 22, 2001.
Office Action dated Sep. 24, 2003, for U.S. Appl. No. 09/888,063, filed Jun. 22, 2001.
Office Action dated Oct. 21, 2003, for U.S. Appl. No. 10/082,036, filed Feb. 20, 2002.
Office Action dated Apr. 2, 2004, for U.S. Appl. No. 10/082,036, filed Feb. 20, 2002.
Office Action dated Jul. 16, 2004, for U.S. Appl. No. 10/082,036, filed Feb. 20, 2002.
Office Action dated Oct. 7, 2004, for U.S. Appl. No. 10/082,036, filed Feb. 20, 2002.
Office Action dated Mar. 11, 2003, for U.S. Appl. No. 09/721,154, filed Nov. 21, 2000.
Office Action dated Sep. 11, 2002, for U.S. Appl. No. 09/721,154, filed Nov. 21, 2000.
Office Action dated Mar. 12, 2002, for U.S. Appl. No. 09/721,154, filed Nov. 21, 2000.
Office Action dated Jan. 21, 2003, for U.S. Appl. No. 09/718,704, filed Nov. 21, 2000.
Office Action dated Oct. 22, 2002, for U.S. Appl. No. 09/718,704, filed Nov. 21, 2000.
Office Action dated Apr. 8, 2002, for U.S. Appl. No. 09/718,704, filed Nov. 21, 2000.
Office Action dated Nov. 19, 2002, for U.S. Appl. No. 09/718,766, filed Nov. 21, 2000.
Office Action dated Mar. 21, 2002, for U.S. Appl. No. 09/718,766, filed Nov. 21, 2000.
Office Action dated Feb. 10, 2003, for U.S. Appl. No. 09/718,836, filed Nov. 21, 2000.
Office Action dated Mar. 25, 2002, for U.S. Appl. No. 09/718,836, filed Nov. 21, 2000.
Office Action dated Jun. 30, 2003, for U.S. Appl. No. 09/311,890, filed May 14, 1999.
Office Action dated Oct. 22, 2002, for U.S. Appl. No. 09/311,890, filed May 14, 1999.
Office Action dated Mar. 26, 2002, for U.S. Appl. No. 09/311,890, filed May 14, 1999.
Office Action dated Jul. 16, 2001, for U.S. Appl. No. 09/311,890, filed May 14, 1999.
International Preliminary Examination Report completed Mar. 6, 2003, for Application No. PCT/US01/47820, filed Dec. 12, 2001.
Written Opinion mailed Dec. 2, 2002, for Application No. PCT/US01/47820, filed Dec. 12, 2001.
International Preliminary Examination Report completed May 22, 2003, for Application No. PCT/US01/20136, filed Jun. 22, 2001.
Written Opinion mailed Mar. 3, 2003, for Application No. PCT/US01/20136, filed Jun. 22, 2001.
International Preliminary Examination Report completed Feb. 3, 2003, for Application No. PCT/US01/13248, filed Apr. 24, 2001.
Written Opinion mailed Dec. 13, 2002, for Application No. PCT/US01/13248, filed Apr. 24, 2001.
International Preliminary Report completed Sep. 26, 2002, for Application No. PCT/US01/27709, filed Sep. 7, 2001.
Written Opinion mailed Jul. 1, 2002, for Application No. PCT/US01/27709, filed Sep. 7, 2001.
International Preliminary Examination Report completed Feb. 9, 2004, for Application No. PCT/US02/05553, filed Feb. 20, 2002.
International Preliminary Examination Report completed Sep. 19, 2003, for Application No. PCT/US02/04492, filed Feb. 14, 2002.
Written Opinion mailed Jun. 12, 2003, for Application No. PCT/US02/04492, filed Feb. 14, 2002.
Hall et al., "Two methods of assessment of methotrexate hepatotoxicity in patients with rheumatoid arthritis," *Annals of the Rheumatic Diseases*, 50(7): 471-476 (1991).

Molinari et al, "Automated Image Analysis for Monitoring Oxidative Burst in Macrophages," *Analytical and Quantitative Cytology and Histology*, 22(5): 423-427 (2000).

Sakai et al., "Rapid and Sensitive Neurotoxicity Test Based on the Morphological Changes of PC12 Cells with Simple Computer-Assisted Image Analysis," *J. Bioscience and Bioengineering*, 90(1): 20-24 (2000).

Sturgeon et al., "In vivo assessment of microcystin-LR-induced hepatotoxicity in the rat using proton nuclear magnetic resonance ($^1$H-NMR) imaging," *Biochimica et Biophysica Acta*, 1454: 227-235 (1999).

Towner et al., "Non-invasive in vivo magnetic resonance imaging assessment of acute aflatoxin B1 hepatotoxicity in rats," *Biochimica et Biophysica Acta*, 1475: 314-320 (2000).

International Search Report and Written Opinion mailed Dec. 16, 2004, for Application No. PCT/US2004/022970, filed Jul. 15, 2004.

New Riverside University Dictionary, published by Houghton Mifflin Company, One Beacon Street, Boston, MA, 02108, p. 413 (1984).

* cited by examiner

CHARACTERIZING BIOLOGICAL STIMULI BY RESPONSE CURVES

CROSS-REFERENCE TO RELATED APPLICATIONS

This application claims the benefit of U.S. Patent Application No. 60/509,040, filed Jul. 18, 2003, which is incorporated herein by reference for all purposes.

This application is related to U.S. patent application Ser. No. 09/789,595 of Vaisberg et al., filed Feb. 20, 2001, and titled "CHARACTERIZING BIOLOGICAL STIMULI BY RESPONSE CURVES," which is incorporated herein by reference for all purposes.

This application is also related to the following co-pending U.S. patent applications, U.S. patent application Ser. No. 10/621,821, filed Jul. 16, 2003 in the names of Kutsyy et al., and titled METHODS AND APPARATUS FOR INVESTIGATING SIDE EFFECTS; U.S. patent application Ser. No. 09/310,879 by Vaisberg et al., and titled DATABASE METHOD FOR PREDICTIVE CELLULAR BIOINFORMATICS; U.S. patent application Ser. No. 09/311,996 by Vaisberg et al., and titled DATABASE SYSTEM INCLUDING COMPUTER FOR PREDICTIVE CELLULAR BIOINFORMATICS; U.S. Pat. No. 6,743,576 titled DATABASE SYSTEM FOR PREDICTIVE CELLULAR BIOINFORMATICS. Each of these applications was filed on May 14, 1999. This application is also related to U.S. patent application Ser. No. 09/729,754 by Vaisberg et al., and titled CLASSIFYING CELLS BASED ON INFORMATION CONTAINED IN CELL IMAGES filed on Dec. 4, 2000. This application is further related to U.S. patent application Ser. No. 09/792,013 by Vaisberg et al., and titled EXTRACTING SHAPE INFORMATION CONTAINED IN CELL IMAGES, and U.S. patent application Ser. No. 09/792,012 by Vaisberg et al., and titled IMAGE ANALYSIS OF THE GOLGI COMPLEX, both filed Jul. 18, 2003. Each of the above patent applications is incorporated herein by reference for all purposes.

BACKGROUND OF THE INVENTION

The present invention relates to techniques for characterizing the response of biological cells to varying levels of a particular stimulus. More specifically, the invention relates to techniques for measuring similarities/dissimilarities between stimulus response curves through, for example, multivariate phenotypic signatures extracted from images of biological cells. The similarity of two such curves can be calculated by measuring a "distance" between them. As explained elsewhere herein, the concept of distance includes both conventional measures of "true" distance such as a Euclidean distance as well as other measures of dissimilarity such as a degree of orthogonality (as with an inner product). Generally, the "distances" characterize the similarity of the stimuli generating the response curves.

Purified substances having a desirable combination of bioactive properties are rare and often difficult to identify. Recent advances in organic chemistry and the development of rapid combinatorial chemistry techniques have increased the number of compounds that researchers can test for a specific biological activity (e.g., binding to a target). Unfortunately, the vast majority of "hits" generated by such techniques do not possess the right combination of properties to qualify as therapeutic compounds. When these substances are subjected to low throughput cellular and animal tests to establish their therapeutic usefulness, they are typically found to fail in some regard. Unfortunately, such tests are time consuming and costly, thus limiting the number of substances that can be tested. In a like regard, the few hits that do possess the right combination of properties avoid recognition until after the low throughput tests are conducted. With better early evaluation techniques, such promising candidates could be identified earlier in the development process and put on a fast track to the marketplace.

Various early evaluation techniques are under investigation and some have shown promise. In particular cellular phenotyping technologies employing sophisticated image analysis have proven very useful in characterizing therapeutic chemicals. Such technologies are generally described in WO/00/70528 published on Nov. 23, 2000. These techniques attempt to classify compounds based on the phenotypic changes that they induce. From these changes, detailed mechanisms of action can be deduced.

Typically, researchers attempting to classify a new compound based on mechanism of action, toxicity, etc. compare features of that compound to known therapeutics. Compounds that exhibit similar biological functioning in some regards may exhibit similarity in other regards. One difficulty in assessing similarity is that compounds often have greatly varying potencies. In other words, while two different compounds may operate by the same or similar mechanism of action, one compound may be effective at a much lower concentration than the other. It is difficult to make meaningful comparison of two such compounds until the dose scales of these compounds have been adjusted. To this end, researchers sometimes use dose response curves to compare compounds. These curves show the biological effectiveness of particular drugs over multiple concentrations. The effect of the drug at each different concentration provides the "points" for the dose response curves.

Typically, such dose response curves are limited to one particular biological feature (e.g., cell count or expression of a protein). The numeric value of such feature is provided as a function of concentration for each compound of interest. The resulting curves can be compared to identify similar trajectories. Two compounds having similar trajectories might be expected to operate by the same mechanism of action, depending upon which biological parameter is being considered. Unfortunately, the value of such comparisons is quite limited. First, many different features may be required to unambiguously characterize a stimulus' mechanism of action. So a simple dose response curve may be inconclusive. Second, even assuming that all the relevant features are captured in the analysis, determining whether the response of an unclassified stimulus more properly belongs to one mechanism or another can be difficult. It requires a trustworthy technique for classification or clustering responses in biological feature space. This, in turn, requires a trustworthy technique for calculating "distances" between the responses in biological feature space.

While many techniques for characterizing compounds and other biological stimuli exist, their full potential for classifying such stimuli by mechanism of action has not yet been realized. Advances will require rigorous and reliable techniques for calculating "distances" between stimulus response curves, such as dose response trajectories for compounds or other stimuli under investigation.

SUMMARY OF THE INVENTION

The present invention provides a method, program code, and apparatus for characterizing and classifying the effect of stimuli on biological systems. It accomplishes this by computing "distances" between stimulus response curves associated with unclassified stimuli and stimulus response curves (e.g., dose response curves) of previously classified stimuli, where such "distances" are a measure of the dissimilarities or similarities between the response curves. In one example, a response curve shows how the phenotypes of one or more cells change in response to varying levels of the stimulus. "Points" on the curve represent distinct phenotypes or "signatures" for cell(s) at a particular level of stimulus (e.g., a particular dose of a therapeutic). The signatures are multivariate phenotypic representations of the cell(s). In many cases of interest, they include various features of the cell(s) obtained by image analysis. Such features may include basic measurements or other parameters obtained from images (e.g., cell shape, nucleus area, Golgi texture) and/or biological characterizations derived from the basic measurements or other parameters (e.g., cell cycle state, mitotic index, etc.). The stimulus response curves are compared, in multivariate biological feature space, to allow classification of stimuli and identify subtle differences in related stimuli.

Comparison of signatures or response curves to one another requires measurements of the similarities or dissimilarities (distances) between the signatures or response curves in biological feature space. In one example, the comparison is used to develop a classification model. Response curves for various stimuli having known classifications are grouped by separation "distance" using various combinations of features. The combination(s) of features that gives the best grouping of response curves based on the known classifications is selected for use in the classification model. In another example, signatures of stimuli having unknown classifications are compared to response curves having known classifications. Distance metrics determine where to classify the stimuli in question.

To reliably measure "distance" in biological feature space, it may be necessary to align and scale the signatures of two or more stimuli to a common center. In a preferred embodiment, the common center is the point in biological feature space where no stimulus is applied. More particularly, for each response curve, which maps a particular stimulus at various levels of stimulus, the starting point corresponds to a level of stimulus equal to "zero." This starting point for each response curve, which amounts to a negative control, coincides with the other response curves and is therefore referred to herein as the common center. Two response curves may be compared by determining the distance between pairs of points that are equidistant from the common center on the two curves. The distance from a common center is sometimes viewed as a "radius" r. In some cases, the "distance" between two curves is obtained by integrating the point-point distance over "dr" ($\Delta r$).

Various "distance" computations, which measure similarities or dissimilarities between response curves, may be employed. Examples include computations of Euclidean distance, angular separation between two lines sharing a common center point, and the cosine of the angle between two lines sharing the common center (i.e., inner product). Note that the inner product is not formally a "distance" measurement. Rather, it is a direct measure of the "similarity" between two or more signatures or response curve points. Points located on orthogonal trajectories are given a similarity value of zero. Points located on coincident trajectories are given a similarity value of one. Points located on trajectories intermediate between orthogonal and coincident are given similarity values intermediate between zero and one. An advantage of using inner product, angle, and other polar or spherical-based measures of distance or similarity is that they do not increase in magnitude at locations farther removed from the common center. Hence, the choice of comparison points close to or far removed from the common center should not have a material impact on the "distance" calculation—assuming that the trajectories are otherwise similar. Note that this is not the case with a Euclidean distance.

Since stimuli may be classified according to mechanism of action using this invention, the feature space for presenting the curves for distance measurements should be carefully chosen. Some features allow for better discrimination between mechanisms of action than other features. Preferably, the features are largely independent of concentration. Hence, two drugs with similar mechanisms of action, but different potencies can be easily identified as belonging to the same class.

One method of classifying a stimulus based on its associated stimulus response path in biological feature space, may be characterized by the following operations: (a) aligning two or more stimulus response paths on a common radius, r, from a point in biological feature space where a negative control is applied; (b) calculating a separation distance, D, between points on two of the stimulus response paths having the common radius, r, from the negative control point; and (c) classifying the stimulus of at least one of the stimulus response paths on the basis of the calculated value of the separation distance, D.

A method for creating a biological classification model for classifying the effect of stimuli on biological systems may be characterized by the following sequence: (a) receiving a training set of stimulus response paths for stimuli having known classifications, wherein the stimulus response paths comprise signatures representing the multivariate response of stimuli at various levels; (b) selecting a collection of biological features to be used in a proposed model; (c) computing distances between the stimulus response paths in a biological feature space defined by the biological features selected in (b); (d) characterizing the proposed model based on how well it groups stimulus response paths into the known classifications of the associated stimuli in the biological features space; (e) repeating (b)-(d) for a plurality of selected collections of biological features; and (f) choosing a proposed model as the biological classification model based on the characterizations made in (d).

In one approach, the stimulus response curves are depicted graphically. Preferably, the graphical depiction presents the curves in a space defined by principal components or other reduced-dimensionality space. Reduced dimensional space may be provided by principal component analysis, linear and non-linear discriminant analysis, multi-dimensional scaling, projection pursuit techniques, and the like.

Another aspect of the invention pertains to computer program products including machine-readable media on which are stored program instructions for implementing at least some portion of the methods described above. Any of the methods of this invention may be represented, in whole or in part, as program instructions that can be provided on such computer readable media. In addition, the invention pertains to various combinations of data and data structures generated and/or used as described herein.

In one aspect the invention provides a method of classifying a stimulus based on its associated stimulus response path in biological feature space. The method may comprise aligning two or more stimulus response paths on a common radius, r, from a point in biological feature space where a negative control is applied; calculating a separation distance, D, between points on two of the stimulus response paths having the common radius, r, from the negative control point; and classifying the stimulus of at least one of the stimulus response paths on the basis of the calculated value of the separation distance, D. In an embodiment of the method, aligning the two or more stimulus response paths may comprise calculating the common radius, r, as a Euclidean distance from the negative control point. In another embodiment of the method, calculating the separation distance, D, may comprise calculating a value based on a spherical geometry including the points sharing the common radius, r, from the negative control point. The value based on a spherical geometry may comprise an angle or an inner product. In another embodiment of the method, the stimulus response paths are associated with particular mechanisms of action, and classifying the stimulus of at least one of the stimulus response paths on the basis of the calculated value of the separation distance, D may comprise classifying the at least one of the stimulus response paths based on the mechanism of action. In another embodiment of the method the stimulus response paths may comprise points that define signatures, and the signatures may comprise phenotype features of a biological system exposed to stimuli. The signatures may be obtained by applying varying levels of the stimuli to the biological system or by monitoring the effect of the stimulus on the biological system over time. The biological system may be a cell line. In another embodiment of the method the stimulus may be exposure to a chemical compound.

In another aspect the invention provides a method of classifying stimuli based on their effects on biological systems. The method may comprise receiving one or more signatures of a stimulus on one or more biological systems, wherein the signatures comprise multivariate data obtained from image analysis of biological systems exposed to the stimulus at specified levels of exposure to the stimulus; computing distances between at least one of the signatures or points on a stimulus response path through multiple signatures, and at least two regions of biological feature space associated with defined stimulus classifications; and classifying the stimulus based on the computed distances. In one embodiment of the method computing the distances may comprise computing an angle or an inner products of vectors, each from a common center point in the biological feature space, wherein a first vector passes through one of the signatures or points of the stimulus and a second vector passes through a point on a stimulus response path associated with a classification in at least one of the regions of biological feature space. In another embodiment of the method computing the distances may comprises computing Euclidean distances. In another embodiment of the method computing the distances may comprise using a nearest neighbor computation. In another embodiment of the method the regions of biological feature space may be associated with particular mechanisms of action, and classifying the stimulus based on the computed distances may comprise classifying the at least one of the stimulus response paths based on the mechanism of action. In another embodiment of the method the signatures may be obtained by applying varying levels of the stimulus to the biological system. In another embodiment of the method the signatures may be obtained by monitoring the effect of the stimulus on the biological system over time. In another embodiment of the method the biological system may be a cell line. In another embodiment of the method the stimulus may be exposure to a chemical compound.

In a further aspect the invention provides a computer program product which may comprise a machine readable medium on which is provided program instructions for classifying a stimulus based on its associated stimulus response path in biological feature space. The instuctions may comprise aligning two or more stimulus response paths on a common radius, r, from a point in biological feature space where a negative control is applied; calculating a separation distance, D, between points on two of the stimulus response paths having the common radius, r, from the negative control point; and classifying the stimulus of at least one of the stimulus response paths on the basis of the calculated value of the separation distance, D. In one embodiment of the computer program product the instructions for aligning the two or more stimulus response paths may comprise instructions for calculating the common radius, r, as a Euclidean distance from the negative control point. In another embodiment of the computer program product the instructions for calculating the separation distance, D, may comprise instructions for calculating a value based on a spherical geometry including the points sharing the common radius, r, from the negative control point. The value based on a spherical geometry may comprise an angle or an inner product. In another embodiment of the computer program product the stimulus response paths may be associated with particular mechanisms of action, and the instructions for classifying the stimulus of at least one of the stimulus response paths on the basis of the calculated value of the separation distance, D, may comprise instructions for classifying the at least one of the stimulus response paths based on the mechanism of action. In another embodiment of the computer program product the stimulus response paths may comprise points that define signatures, and the signatures may comprise phenotype features of a biological system exposed to stimuli.

In another aspect the invention provides an apparatus for classifying a stimulus based on its associated stimulus response path in biological feature space. The apparatus may comprise one or more processors; and memory, wherein the one or more processors are designed or configured to classify the stimulus based on a separation distance, D calculated between points on stimulus response paths, which points are aligned on a common radius, r, from a point in biological feature space where a negative control is applied.

In another aspect the invention provides a computer program product, which may comprise a machine readable medium on which is provided program instructions for classifying stimuli based on their effects on biological systems. The instructions may comprise receiving one or more signatures of a stimulus on one or more biological systems, wherein the signatures comprise multivariate data obtained from image analysis of biological systems exposed to the stimulus at specified levels of exposure to the stimulus; computing distances between at least one of the signatures or points on a stimulus response path through multiple signatures, and at least two regions of biological feature space associated with defined stimulus classifications; and classifying the stimulus based on the computed distances. In one embodiment of the computer program product the instructions for computing the distances may comprise instructions for computing an angle or an inner products of vectors, each from a common center point in the biological feature space, wherein a first vector passes through one of the signatures or points of the stimulus and a second vector passes through a point on a stimulus response path associated with a classification in at least one of the regions of biological feature space. In another embodiment of the computer program product the instructions for computing the distances may comprise instructions for computing Euclidean distances. In another embodiment of the computer program product the instructions for computing the distances may comprise instructions for using a nearest neighbor computation. In another embodiment of the computer program product the regions of biological feature space may be associated with particular mechanisms of action, and the instructions classifying the stimulus based on the computed distances may comprise instructions for classifying the at least one of the stimulus response paths based on the mechanism of action.

In another aspect the invention provides an apparatus for classifying stimuli based on their effects on biological systems. The apparatus may comprise one or more processors; and a memory, wherein the one or more processors are designed or configured to classify the stimulus based on the distances between signatures or points on a stimulus response path through multiple signatures, and regions of biological feature space associated with defined stimulus classifications, and wherein the signatures comprise multivariate data obtained from image analysis of biological systems exposed to the stimulus at specified levels of exposure to the stimulus.

In another aspect the invention provides a method of creating a biological classification model for classifying the effect of stimuli on biological systems. The method may comprise receiving a training set of stimulus response paths for stimuli having known classifications, wherein the stimulus response paths comprise signatures representing the multivariate response of stimuli at various levels; selecting a collection of biological features to be used in a proposed model; computing distances between the stimulus response paths in a biological feature space defined by the biological features selected; characterizing the proposed model based on how well it groups stimulus response paths into the known classifications of the associated stimuli in the biological features space; repeating the selecting, computing, and characterizing for a plurality of selected collections of biological features; and choosing a proposed model as the biological classification model based on the characterizations made. In an embodiment of the method the signatures of a response path are obtained by applying varying levels of a stimulus to a biological system. In another embodiment of the method the biological systems may be a cell line. In another embodiment of the method the stimuli comprise exposure to chemical compounds. In another embodiment of the method the collection of biological features selected may comprise one or more of morphological details, texture measures for a marker, intensity measures for a marker, statistical details, and values derived from any of the foregoing of a cell or cell population. In another embodiment of the method computing the distances may comprise computing an angle or an inner products of vectors, each from a common center point in the biological feature space, wherein a first vector passes through one of the signatures or points of a first stimulus response path and a second vector passes through one of the signatures or points of a second stimulus response path. In another embodiment of the method computing the distances may comprise computing Euclidean distances.

In another aspect the invention provides a computer program product comprising a machine readable medium on which is provided program instructions for creating a biological classification model for classifying the effect of stimuli on biological systems. The instructions may comprise receiving a training set of stimulus response paths for stimuli having known classifications, wherein the stimulus response paths comprise signatures representing the multivariate response of stimuli at various levels; selecting a collection of biological features to be used in a proposed model; computing distances between the stimulus response paths in a biological feature space defined by the biological features selected; characterizing the proposed model based on how well it groups stimulus response paths into the known classifications of the associated stimuli in the biological features space; repeating the selecting, computing, and characterizing for a plurality of selected collections of biological features; and choosing a proposed model as the biological classification model based on the characterizations made. In one embodiment of the computer program product the collection of biological features selected by the instructions may comprise one or more of morphological details, texture measures for a marker, intensity measures for a marker, statistical details, and values derived from any of the foregoing of a cell or cell population. In another embodiment of the computer program product the instructions for computing the distances may comprise instructions for computing an angle or an inner products of vectors, each from a common center point in the biological feature space, wherein a first vector passes through one of the signatures or points of a first stimulus response path and a second vector passes through one of the signatures or points of a second stimulus response path. In another embodiment of the computer program product the instructions for computing the distances may comprise instructions for computing Euclidean distances.

In another aspect the invention provides a method of determining a separation distance between response paths associated with a plurality of stimuli in a biological feature space. The method may comprise receiving response paths of two or more stimuli, wherein the response paths represent the responses of one or more biological systems to the stimuli; aligning the response paths of the stimuli on the basis of distance from a common point in the biological feature space; and determining a distance between the aligned response paths. In an embodiment of the method determining the distance may comprise integrating an expression for distance between aligned points on the aligned response paths. The expression for distance may be an expression for angle or inner product.

These and other features and advantages of the present invention will be described in more detail below with reference to the associated figures.

DETAILED DESCRIPTION

Introduction

Figure 1:
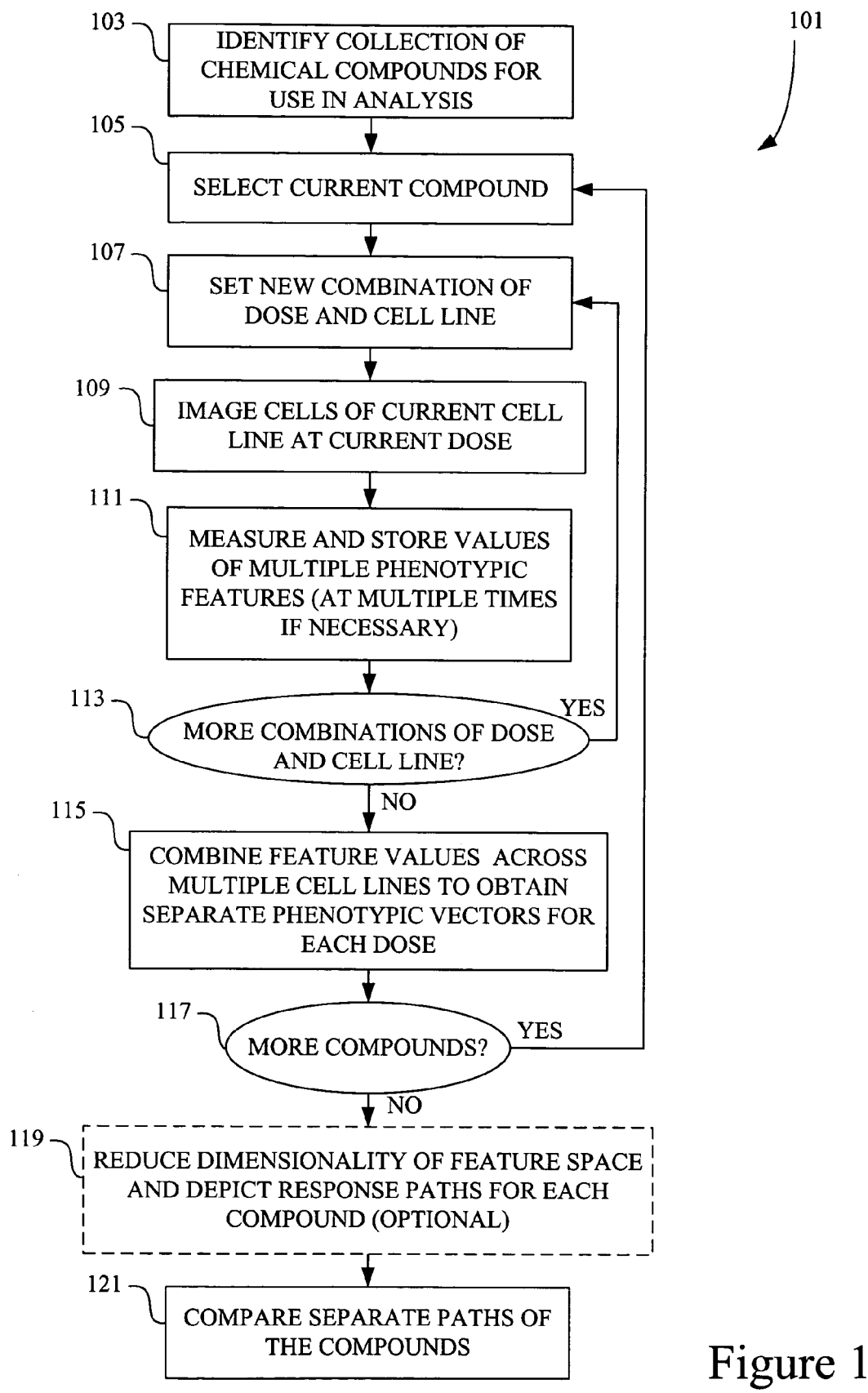
FIG. 1 is a process flow chart depicting the preparation and use of a stimulus response curve based upon phenotypic data.

The present invention allows for comparison of response paths in multidimensional space. It also allows for comparison of a singular response (signature) and a response path. The response path(s) may span various levels of a stimulus, with each point in the path representing a different level of the stimulus. For example, each point might represent a different concentration or dose of chemical compound. Alternatively, each point in the path may represent a different time after initial exposure to a chemical compound. Other examples are presented below. Each point (signature) in the response path typically contains multivariate information about a cell's or population of cells' response to a particular level of the stimulus.

In many embodiments, the multivariate signatures of stimuli contain some phenotypic information about the cells affected by the stimuli. Such phenotypic information may provide morphological details, texture and intensity measures for a marker, statistical details, and/or higher-level biological characterizations of the cell or cell population. In an especially preferred embodiment, such features are extracted directly or indirectly from images of the cells. Of course, the multivariate information in the data points may include non-phenotypic information as well. Such information can derive from any of a number of different assays and/or other data sources such as public literature and databases or any chemical properties of the compound.

It is useful to consider the effect of a stimulus in a multidimensional "biological feature" space comprised of a separate axis or dimension for each biological feature used to characterize stimuli. Examples of such features include mitotic state, cell shape, cell count, Golgi condition, etc.

Within such space, a response curve and a region of space proximate the response curve may be associated with a particular mechanism of action. In other words, biological feature space is divided into various mechanisms of action. Some regions may belong exclusively to one mechanism of action. Others may belong to multiple mechanisms of action. Further, particular trajectories through biological feature space may belong to one or a limited number of mechanisms. For example, compounds that affect microtubules, such as Taxol, may follow a path in which the mitotic index of cells exposed to the compound initially remains low, then rapidly increases, and finally plateaus.

To properly classify stimuli by mechanism of action, one needs a trustworthy method for computing distance between signatures and response paths. This invention provides various methods for this purpose. Frequently, it is necessary to measure distance in a feature space that de-emphasizes potency differences between different stimuli. In this manner, two stimuli that have the same mechanism of action but have different potencies can be classified together. This requires judiciously choosing the features defining a feature space in which to measure distance. Methods for choosing such features will be described below. In addition to using a different feature set (or alternatively), one can sometimes account for potency differences by using an aligning or scaling procedure for the response curves. Note that in some embodiments, it will be important to account for potency differences, and hence other features will need to be considered or other scaling/aligning procedures will need to be used.

Another issue central to distance measurements is how to choose points for comparison on two different stimulus response paths. In the simplest case, one could simply choose the closest points on the two paths and compute distances therebetween. For many trajectories, however, this will represent a reliable measure of distance.

A better measure is obtained by first aligning the stimulus response paths on a common scale for measuring distances. Alignment may be accomplished by a coordinate transformation in which points on response curve are characterized in terms of their distance "r" from a "common center." This common center is preferably, the point in biological feature space occupied by a negative control. For example, if each stimulus constitutes exposure to a different drug, the common center is the point in each stimulus response path where drug concentration is zero. Points on two response curves are selected for a distance measurement if they are each the same distance r from the common center (point of zero stimulus).

One may calculate the distance between these two points by various techniques. Certain preferred techniques employ a measure of angle, inner product or some other computation that is based on a polar or spherical geometry and therefore does not give a distance value that increases with r from the center when two rays are considered. In some embodiments, other conventional measures of distance, such as a Euclidean distance, may be employed in place of the spherical geometry case.

The "distance" between two aligned response paths may be computed by integrating over a biologically relevant region on the paths with respect to "dr" or $\Delta r$. These concepts will be described in more detail below.

Context and Relevant Definitions

Some of the terms used herein are not commonly used in the art. Other terms may have multiple meanings in the art. Therefore, the following definitions are provided as an aid to understanding the description that follows. The invention as set forth in the claims should not necessarily be limited by these definitions.

The term "component" or "component of a cell" refers to a part of a cell having some interesting property that can be employed to derive biologically relevant information using image analysis. General examples of cell components include biomolecules and cellular organelles. Specific examples of biomolecules that could serve as cell components for use with this invention include proteins, lipids, polysaccharides, proteins, etc. Sometimes, the relevant component will refer to a group of structurally or functionally related biomolecules. Alternatively, the component may represent a portion of a biomolecule such as a polysaccharide group on a protein, or a particular sequence of a nucleic acid or protein. Collections of molecules such as micells can also serve as cellular components for use with this invention. And subcellular structures such as vesicles and organelles may also serve the purpose.

The term "marker" or "labeling agent" refers to materials that specifically bind to and label cell components. These markers or labeling agents should be detectable in an image of the relevant cells. Typically, a labeling agent emits a signal whose intensity is related to the concentration of the cell component to which the agent binds. Preferably, the signal intensity is directly proportional to the concentration of the underlying cell component. The location of the signal source (i.e., the position of the marker) should be detectable in an image of the relevant cells.

Preferably, the chosen marker binds indiscriminately with its corresponding cellular component, regardless of location within the cell. Although in other embodiments, the chosen marker may bind to specific subsets of the component of interest (e.g., it binds only to sequences of DNA or regions of a chromosome). The marker should provide a strong contrast to other features in a given image. To this end, the marker is typically luminescent, radioactive, fluorescent, etc. Various stains and compounds may serve this purpose. Examples of such compounds include fluorescently labeled antibodies to the cellular component of interest, fluorescent nucleic acid intercalators, and fluorescent lectins, and small fluorescent molecules preferentially binding to a cellular component. The antibodies may be fluorescently labeled either directly or indirectly.

The term "stimulus" refers to something that may influence the biological condition of a cell. Often the term will be synonymous with "agent" or "manipulation." Stimuli may be materials, radiation (including all manner of electromagnetic and particle radiation), forces (including mechanical (e.g., gravitational), electrical, magnetic, and nuclear), fields, thermal energy, and the like. General examples of materials that may be used as stimuli include organic and inorganic chemical compounds, biological materials such as nucleic acids, carbohydrates, proteins and peptides, lipids, various infectious agents, mixtures of the foregoing, and the like. Other general examples of stimuli include non-ambient temperature, non-ambient pressure, acoustic energy, electromagnetic radiation of all frequencies, the lack of a particular material (e.g., the lack of oxygen as in ischemia), temporal factors, etc.

Specific examples of biological stimuli include exposure to hormones, growth factors, antibodies, or extracellular matrix components. Or exposure to agents such as infective materials such as viruses that may be naturally occurring viruses or viruses engineered to express exogenous genes at various levels. Biological stimuli could also include delivery of antisense oligopolynucleotides by means such as gene transfection. Stimuli also could include exposure of cells to conditions that promote cell fusion. Specific physical stimuli could include exposing cells to shear stress under different rates of fluid flow, exposure of cells to different temperatures, exposure of cells to vacuum or positive pressure, or exposure of cells to sonication. Another stimulus includes applying centrifugal force. Still other specific stimuli include changes in gravitational force, including sub-gravitation, application of a constant or pulsed electrical current. Yet other stimuli include incubation in the presence of small (often organic) molecules that may affect cells. Still other stimuli include irradiation, photobleaching, which in some embodiments may include prior addition of a substance that would specifically mark areas to be photobleached by subsequent light exposure. In addition, these types of stimuli may be varied as to time of exposure, or cells could be subjected to multiple stimuli in various combinations and orders of addition. Of course, the type of manipulation used depends upon the application.

The term "phenotype" generally refers to the total appearance of an organism or cell from an organism. In the context of this invention, cellular phenotypes and their representations in processing systems (e.g., computers) are particularly interesting. A given cell's phenotype is a function of its genetic constitution and environment. Often a particular phenotype can be correlated or associated with a particular biological condition or mechanism of action resulting from exposure to a stimulus. Generally, cells undergoing a change in biological conditions will undergo a corresponding change in phenotype. Thus, cellular phenotypic data and characterizations may be exploited to deduce mechanisms of action of a stimulus and other aspects of cellular responses to various stimuli.

A selected collection of data and characterizations that represent a phenotype of a given cell or group of cells is sometimes referred to as a "signature" or "quantitative cellular phenotype." This collection is also sometimes referred to as a phenotypic fingerprint or just "fingerprint." The multiple cellular attributes or features of the signature can be collectively stored and/or indexed, numerically or otherwise. The attributes are typically quantified in the context of specific cellular components or markers. Measured attributes useful for characterizing an associated phenotype include morphological descriptors (e.g., size, shape, and/or location of the organelle) and composition (e.g., concentration distribution of particular biomolecules within the organelle). Other attributes include changes in a migration pattern, a growth rate, cord formation, an extracellular matrix deposition, and even cell count.

The signatures may themselves serve as individual points on response curves of this invention. A phenotypic response to stimulus may be characterized by exposing various cell lines to a stimulus of interest at various levels (e.g., doses of radiation or concentrations of a compound). In each level within this range, the phenotypic descriptors of interest are measured to generate quantitative phenotypes associated with levels of stimulus.

The term "path" or "response curve" refers to the characterization of a stimulus at various levels and/or at different times after application of a stimulus. For example, the path may characterize the effect of a chemical applied at various concentrations or the effect of electromagnetic radiation provided to cells at various levels of intensity or the effect of depriving a cell of various levels of a nutrient. In another example, the path characterizes the effect of a stimulus at various times after the stimulus was initially applied. Mathematically, the path is made up of multiple points, each at a different level of the stimulus and/or time point. In accordance with this invention, each of these points is preferably a collection of parameters or characterizations describing some aspect of a cell or collection of cells. Typically, at least some of these parameters and/or characterizations are derived from images of the cells. In this regard, they represent signatures of the cells. In the sense that each point in the path may contain more than one piece of information about a cell, the points may be viewed as arrays, vectors, matrices, etc. To the extent that the path connects points containing phenotypic information (separate quantitative phenotypes), the path itself may be viewed as a "stimulus level-independent phenotype."

The path itself may simply be a collection of line segments joining successive signatures associated with a given stimulus. Alternatively, the path may be represented as an analytic function (f(x1, x2, . . . )) that fits the individual signatures. Such functions may be generated using various multivariate curve fitting methods.

As used herein, the term "feature" refers to a phenotypic property of a cell or population of cells. Typically, the points (signatures) in a response curve of this invention are each comprised of multiple features. The terms "descriptor" and "attribute" may be used synonymously with "feature." Features derived from cell images include both the basic features extracted from a cell image and the "biological characterizations" (including biological classifications such as cell cycle states). The latter example of a feature is typically obtained from an algorithm that acts on the basic features. The basic features are typically intensity, location, population size, morphological, concentration, and/or statistical values obtained by analyzing a cell image showing the positions and concentrations of one or more markers bound within the cells.

In the context of this invention, the term "distance" is used to describe various measures of the similarity or dissimilarity between signatures or response curves. Furthermore, distance generally refers to the quantification of the separation of a point (signature) or response curve to another point or response curve. Distances are measured across a "space" defined by a coordinate system having one or more axes, each of which corresponds to a particular biological feature or parameter. Distance across this space may be measured by various mathematical techniques. For example, it may be measured using an inner product, an angle between two rays from a common center to two points in the space, a Euclidean distance, or the like. Note that some computations, such as inner product, are not strictly speaking a measure of distance between points in space. Rather they measure similarity (distance) based on angular separation.

In some instances, it can be important to choose a coordinate system that emphasizes the effectiveness of a stimulus (e.g., cell killing strength) and de-emphasizes or masks any offset in a response path due solely to differing potencies between two stimuli. It is also desirable in some instances to "align" the response curves or signatures of multiple stimuli to a common center in the space. This common center is typically the "zero point" for each dimension (axis) in the space and represents the value of those dimensions when a negative control is used to generate the biological value. In an important application, distance is used to classify stimuli on the basis their response curves, and more particularly the distances from their response curves to previously classified response curves or general regions of feature space.

"Aligning" refers to an operation performed on a signature or response curve in biological feature space to place on a scale that is appropriate for measuring distances. Typically, two response curves or a response curve and a signature are aligned before comparing to measure distances between them. The alignment operation generally identifies the specific pairs of points (one from each curve) that are to be used for measuring distances. For example, the alignment operation can show that a point X1 on curve A1 aligns with a point X2 on curve A2. Thus, to assess, or partially assess, the distance between curves A1 and A2, one measures the distance between X1 and X2. Stated another way, an alignment is a mapping of all or part of one response curve on to all or part of another response curve. After an alignment is established many dissimilarity or similarity measures between the response curves can be made based on the collection of point-to-point measurements between aligned points on the response curves. Some of these measures may use reference points, in particular a center point.

Alignment can be made with respect to various parameters or features in the feature space in which the response curves are presented. It has been found, however, that a particularly useful alignment is made with respect to distance from a common center point. In other words, two points, one in each of two paths, are aligned when they are equidistant from the common center point in feature space. That common center point is frequently chosen to be the point where no stimulus is applied to the biological system. For example, the phenotype of cells that are exposed to no stimulus (or a negative control) represents the common center point in feature space. All stimulus response curves will share this center point. A given distance (or "radius") r from the center point defines a multidimensional sphere in the biological feature space. All stimulus response curves are said to be aligned on r. So points that intersect a given value of r on two or more distinct response curves are used for comparing the curves. Essentially, a spherical coordinate system has been defined. This concept will be illustrated in more detail below with respect to FIGS. 3A and 3B.

Note that the individual dimensions of a multidimensional biological feature space may have many different scales. For example, a feature A may range in value from 0–5000 A units, while a feature B may range in value from 0–0.15 B units. To normalize the various dimensions, it may be appropriate to scale the individual dimensions by setting the mean values of the data for each dimension to zero and then dividing the resulting values by the standard deviation of the data or the standard deviation of the controls. Other techniques for normalizing or scaling multidimensional data may be used with this invention.

Figure 4A:
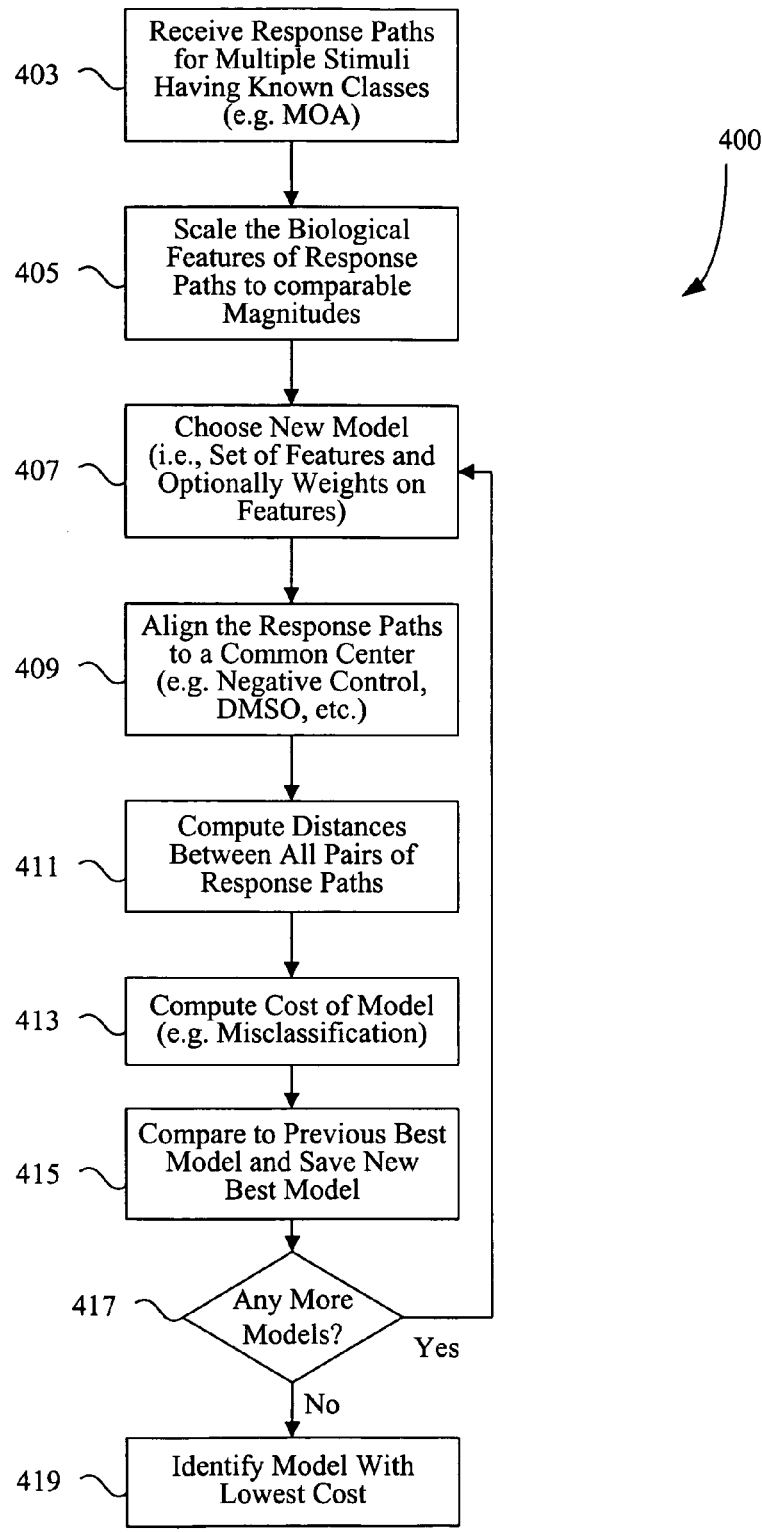
FIG. 4A is a process flow chart depicting a method for developing a model (characterized by a group of biological features with appropriate weightings) for classifying mechanisms of action using distance measurements in accordance with embodiments of this invention.
Figure 4B:
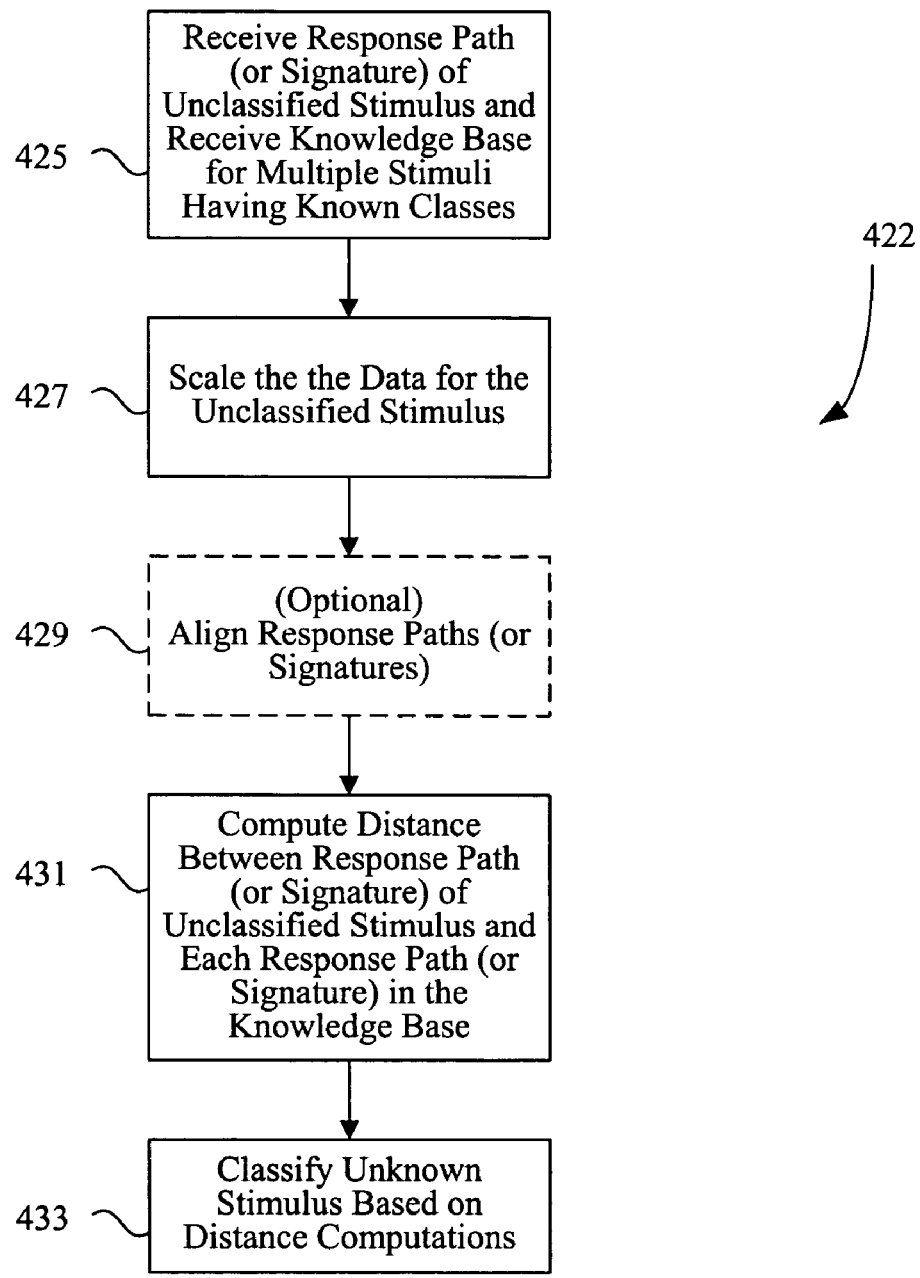
FIG. 4B is a process flow chart depicting a method for classifying previously unclassified stimuli by mechanism of action using distance measurements in accordance with embodiments of this invention.

FIG. 1 depicts a sample process flow for generating response paths, which can then be used to classify unknown stimuli based on their mechanisms of action. As described in more detail below, FIGS. 4A and 4B illustrate sample process flows for using these response paths to perform distance calculations that can be used to classify unknown stimuli based on their mechanisms of action. As depicted in FIG. 1, a process 101 begins by identifying a collection of chemical compounds for use in the analysis. See block 103. This operation may be performed by a computing apparatus or possibly by one or more human beings. The compounds selected at 103 will ultimately be used to generate data that defines a "phenotypic feature space" for comparing multiple response paths.

After the relevant collection of chemical compounds has been identified at 103, the process next selects one current compound at 105. Each compound represents a cycle in an iterative process in which multiple compounds are analyzed to generate relevant phenotypic data. Each new iteration begins with operation 105. In practice, multiple compounds may be analyzed in parallel, so the iterative/sequential nature of the process may not be always strictly accurate. Regardless of how the process is depicted, multiple compounds are evaluated at some point. The flow chart simply depicts this fact.

With a current compound selected, the process next selects a particular combination of compound dose and cell line for application of the dose. See block 107. In a preferred embodiment, each compound has an associated matrix of cell lines and doses. This matrix represents the fact that multiple distinct cell lines are treated with the compound of interest, each at multiple doses. Each combination of dose and cell line provides one or more phenotypic features. Note that multiple features may be extracted from a single cell line. And the features extracted from all cell lines define a multivariate signature or point for a given dose of a given compound. Ultimately, the response path passes through distinct points, each representing a separate dose of a particular compound. At each dose, the phenotypic information (signature) spans multiple cell lines. In principle, the points on the response path can be confined to a single cell line.

After a current combination of dose and cell line has been selected, the process next images the cells of the current cell line that have been exposed to the current compound at the current dose. See block 109. If more than one cell component is to be considered, the imaging apparatus may generate multiple images, one for each cell component/marker combination. At 111, the process performs an image analysis that measures and stores values for each feature. In some embodiments, these features will be separately extracted from multiple images of the cell line taken at different times after exposure to the compound. At 113, the process determines whether there are additional combinations of dose and cell lines to be considered. If so, process control returns to 107 where the next combination of dose and cell line is selected.

Ultimately, all the relevant combinations of dose and cell line for a given compound have been imaged and analyzed. At that point, process control proceeds to block 115 where the system combines feature values across multiple cell lines to obtain separate phenotypic signatures for each separate dose. These signatures represent the individual points in a response path associated with the current compound.

At 117, the process determines whether there are more compounds to be considered as part of the analysis. If so, process control returns to block 105 where the next current compound is selected. Thereafter, that compound is treated as described above with respect to blocks 107 through 115.

Note that some or all of the operations described above for each compound may be automated and performed by a machine. The machine operations may be performed by various image acquisition and image analysis apparatus.

After each of the compounds from the collection identified at 103 has been analyzed as described above, the process has numerous phenotypic signatures (quantitative phenotypes), each of which is associated with a particular combination of chemical compound and dose. Each of the signatures represents a point in multidimensional space. The numerous dimensions may be difficult to depict in a manner that presents meaningful information to a human viewer. Further, many of the features (dimensions) add little to (or even confuse) the comparison of compounds on the basis of dose response paths. Therefore, process 101 optionally reduces the dimensionality of feature space and depicts response paths for each compound in the reduced dimensional space. See 119. One preferred approach to this involves performing a principle component analysis on the collection of separate phenotypic signatures. Alternatively, or in addition, the some feature may simply be removed if they are deemed unimportant or problematic. Still further, in some contexts, it will be unnecessary reduce dimensionality because only the most relevant features were extracted to begin with. This may be the case when, for example, a model such as one identified using the method of FIG. 4A dictates that only certain features are used to characterize compounds.

After the reduced dimensional space has been generated, if necessary, the system may next compare the separate paths of the individual compounds. See 121. This can provide relevant information about the mechanism of action of the various compounds. It allows a human or computer algorithm to compare the various paths and draw conclusions about the mechanisms of action of the various compounds. The comparison involves some measure of distance between response paths or between signatures and response paths. Such comparisons, which can be used to classify unknown stimuli, are described in more detail below with regard to FIGS. 4A and 4B.

Note that the discussion of process 101 treats exposure to chemical compounds as the stimuli of interest. The process 101 can be extended to cover any particular stimulus, not just exposure to chemical compounds. As mentioned, stimuli of interest to the present invention include exposure to biological agents, exposure to various fields, forces, and radiation, deprivation of agents important for normal cell growth and functioning, etc.

Also, alternative definitions of response path that do not involve variation over dose or time could be employed. For example, a path could be provided through multiple distinct cell lines, where each point on the path represents a different cell line.

Aligning Response Curves and Calculating Distances

Figure 2A:
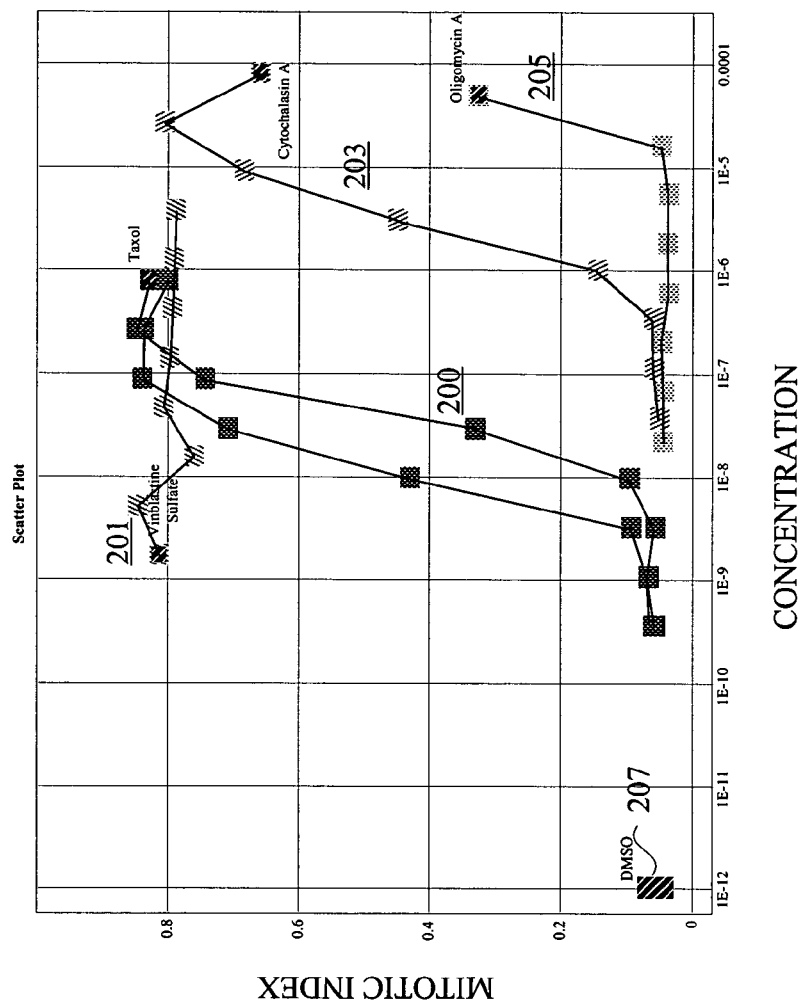
FIG. 2A is a graph of a biological feature as a function of drug concentration (stimulus level, generically) showing drugs having similar response curves offset by differences in drug potency.

FIG. 2A presents a sample plot of biological response (vertical axis) versus drug concentration (horizontal axis) for different drugs. While actual data was used, the identity of the particular biological response feature (vertical axis) is unimportant.

As shown, four different drugs were tested against a cell line at multiple concentrations. Taxol, one of the drugs, was tested twice. For each drug at each concentration various images were taken to extract various cellular features by image analysis. In some cases, basic extracted features are analyzed using appropriate classification algorithm to provide higher-level biological classifications such as mitotic state. In FIG. 2A, the feature is "mitotic index" (a numerical classification of the cells an image on basis of the fraction of them in mitosis) shown as the dependent variable with respect to concentration in a two-dimensional plot.

All drugs were provided in an aqueous solution of dimethyl sulfoxide (DMSO). As a negative control, the cells were exposed to aqueous DMSO without any drug present. Normally, an aqueous DMSO solution is used as the solvent for delivering drugs to samples. The feature values extracted for cells exposed to the DMSO control are shown as signatures 207.

In the upper portion of the plot, a response path 201 passes through signatures generated using the drug Vinblastine Sulfate. It maintains a relatively high numerical value of mitotic index at various concentrations. In the lower right portion of the plot, a response path 205 passes through the signatures for the drug Oligomycin A. As shown, Oligomycin A has very little impact on mitotic index until relatively high concentrations are used.

The most prominent dose response trajectories in FIG. 2A are those of Taxol (response paths 200) and Cytochalasin A (response path 203). The response curves of these drugs present a similar "S-shaped" trajectory. Therefore, one might believe that Taxol and Cytochalasin A possess similar mechanisms of action. But the response paths 200 and 203 are offset with concentration, possibly due to different potencies of the drugs. Note that is difficult to compare Vinblastine Sulfate and Oligomycin A because the concentration ranges employed may not show their full trajectories, again possibly due to very different potencies.

Ideally, stimulus response paths could be compared on scales independent of the potencies of the various drugs employed. To this end, a classification algorithm could evaluate the shape or trajectory of the response curves. However, it is generally difficult to classify based on shape only. Better results might be achieved using a classification technique based on separation distance (or the integral of separation distance). But a challenge is to find a way to use distance for automatically identifying similar response paths and across different potencies.

One possible approach would involve shifting the concentration scales of the various compounds to line them with one another. However, this requires a priori knowledge of the biological function or potency of the drugs. Thus, the approach is not feasible when testing uncharacterized stimuli of unknown mechanism—particularly when only a single signature is available (as opposed the multiple signatures that comprise a response curve).

Figure 2B:
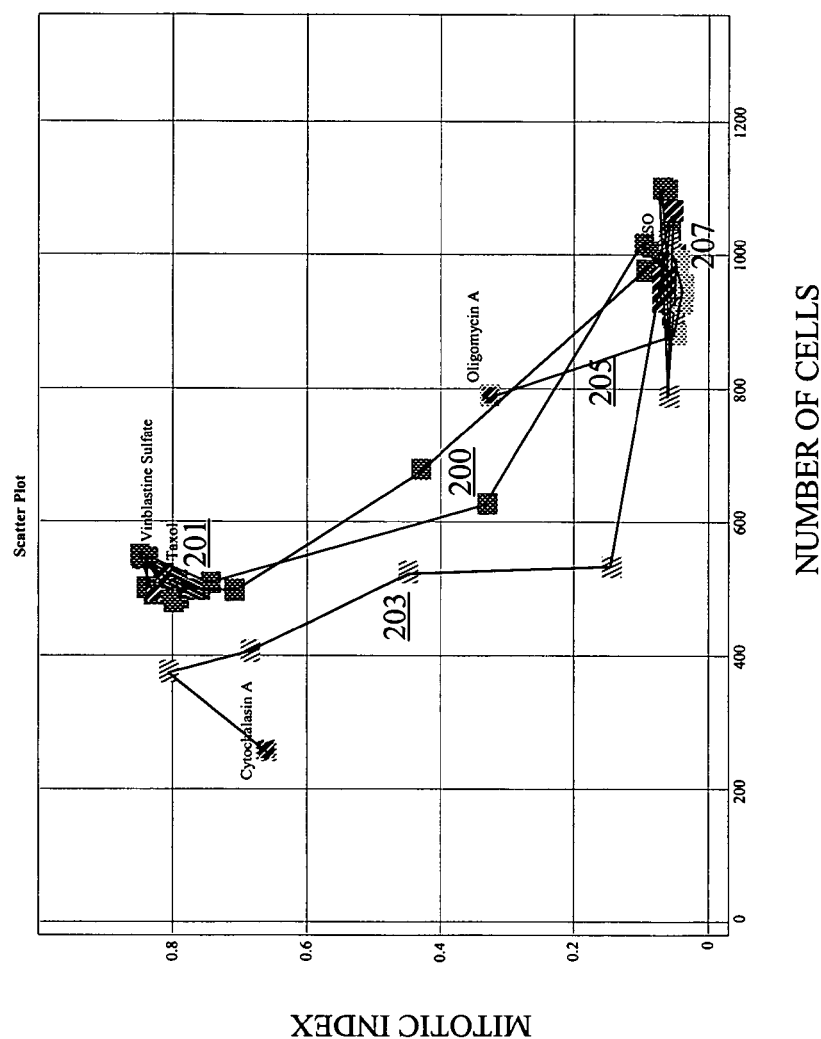
FIG. 2B is a graph of the biological feature of FIG. 2A, but as a function of a different biological feature (not concentration) that represents the effect of the drug and thereby reduces the response curve offset shown in FIG. 2A.

Another approach replaces the concentration variable (generally a level of stimulus variable) with another variable that can depict a trajectory but is relatively independent of potency. In other words, the chosen feature space is independent (or largely independent) of dose (concentration). One example of this approach is depicted in FIG. 2B, which shows a plot of signatures for the drugs of FIG. 2A, but with concentration not displayed as a variable. Rather, the plot shows mitotic index and number of cells as axes. This new variable is a measure of the number of cells that survived the treatment. Because the variable changes only when the drug begins taking effect (regardless of absolute concentration), it effectively puts all curves on the same potency scale. Using this plot, one can more rigorously classify Taxol and Cytochalasin A as having the same mechanism of action (based on mitotic index as the dependent variable). In addition, one can see that high concentrations of Taxol appear to act similarly to the tested concentrations of Vinblastine Sulfate (at least with regard to the mitotic index feature).

Using a biological feature space as shown in FIG. 2B, one can use distances between individual paths or points to gain meaningful comparisons of the drugs. Obviously, this requires proper identification of biological features that allow for such distance-based comparisons. Unfortunately, this is not an intuitively easy process. As explained below with reference to FIG. 4A, one application of the distance computations of the present invention is to identify a set of biological features that do a good job of classifying stimuli by mechanism of action (i.e., they do a good job of discriminating between stimuli with different mechanisms of action). With the right set of features, stimuli that act by the same or similar mechanisms will cluster in the feature space. Generally, in order to effectively classify stimuli having unknown mechanisms, one must have at least (1) a set of biological features (feature space) that do a good job of separating stimuli with different mechanisms of action, toxicities, etc. and (2) a reliable technique for computing distance or similarity in the chosen feature space.

Fundamentally, the technique for computing distance needs to determine which points on two different response curves to match for measuring a distance. In the case where there is a single signature for comparison to a response curve, the method needs to identify the point on the curve from which to measure distance to the signature.

The points for comparison can be chosen by many different techniques. In the most conceptually simple technique the comparison method simply chooses a point for comparison a first curve, then identifies the closest point on a second curve, and computes the distance between the two points. Obviously, for any given point on a first curve, there is a point (or possibly multiple points) on a second curve that is closer than the other points on the second curve. This point is generally located on the second curve at position that forms a right angle with the line connecting the points on the first and second curves. In some cases, it may be appropriate to use this "shortest distance" as a measure of distance between the two curves at a given point on the first curve. The method simply identifies the closest point on the second curve and then calculates a Euclidean distance between the two points. However, this approach should be used with the recognition that it does not account for the effect of distance from a center point when comparing two diverging response paths. A distance measurement of such paths made close to the center point will be far smaller than a distance measurement made far from the center point.

Another preferred approach chooses points for distance comparison based on a common scale or variable used to align the response paths (or the signature and curve). This scale could be one of the dimensions chosen for the biological space; e.g., number of cells in the image. Alternatively, and preferable, it is a radial distance "r" from a common starting point or "center" in the feature space. As used herein, this distance r may be viewed as a "radius" or radial dimension in a spherical coordinate space. It should not be confused with the distance between a signature and a response path. This distinction will be made clear in FIG. 3A.

Alignment on r involves transforming the biological space from one coordinate system to another. In the new coordinate system, r (distance from the common center) is one of the dimensions. It provides the dimension on which curves are aligned to allow distance measurements. Distance is measured between two points that have the same value of r.

The values of r are preferably calculated as a Euclidean distance from the common center point. As indicated, the common center point is preferably a point of negative control (e.g., the biological features values observed with the stimulus value is zero). Thus, the value of r may be calculated by the following expression:

$$r = d(x) = \sqrt{\sum_{i=1}^{n} (x_i - x(\text{control})_i)^2} \quad \text{(Equation 1A)}$$

Note that this is only one of the ways to compute the distance to center. An easy generalization would be weighted sum, and a next generalization would be l norm, with some mild constrains on $w_i$.

$$\ddot{r} = \sqrt[k]{\sum_{i=1}^{n} |w_i(x_i - x(\text{control})_i)|^k} \quad \text{(Equation 1B)}$$

In these expressions, the xi are the values of the features that make up a signature or other point a response curve, the x(control)i are the values of the features for a negative control, and i is the index for dimensions (features) that comprise the biological feature space of the response curves. As explained above, for drug stimuli, aqueous DMSO is used as a solvent. When it is used without a drug at any concentration, it serves as a negative control. Obviously, other types of negative control will be appropriate for other types of stimulus. Note that if variables are normalized to the mean as mentioned above, x(control)=0.

For some methods of computing distances, the "r transformation," is limited to response curves (or portions of response curves) that grow monotonically with respect to "r." In other words, the variable values of the curves should increase monotonically with increasing distance from the common center point.

It is convenient to view the use of the radius r as a coordinate transformation from concentration as an independent variable to r as an independent variable. Because r is a function of concentration (r=g(concentration)), a stimulus' signature may be viewed as a new function f(r) assuming that g−1(r) is monotonic:

Signature=$F$(concentration)=$F(g^{-1}(r))=f(r)$ (Equation 2)

Figure 3A:
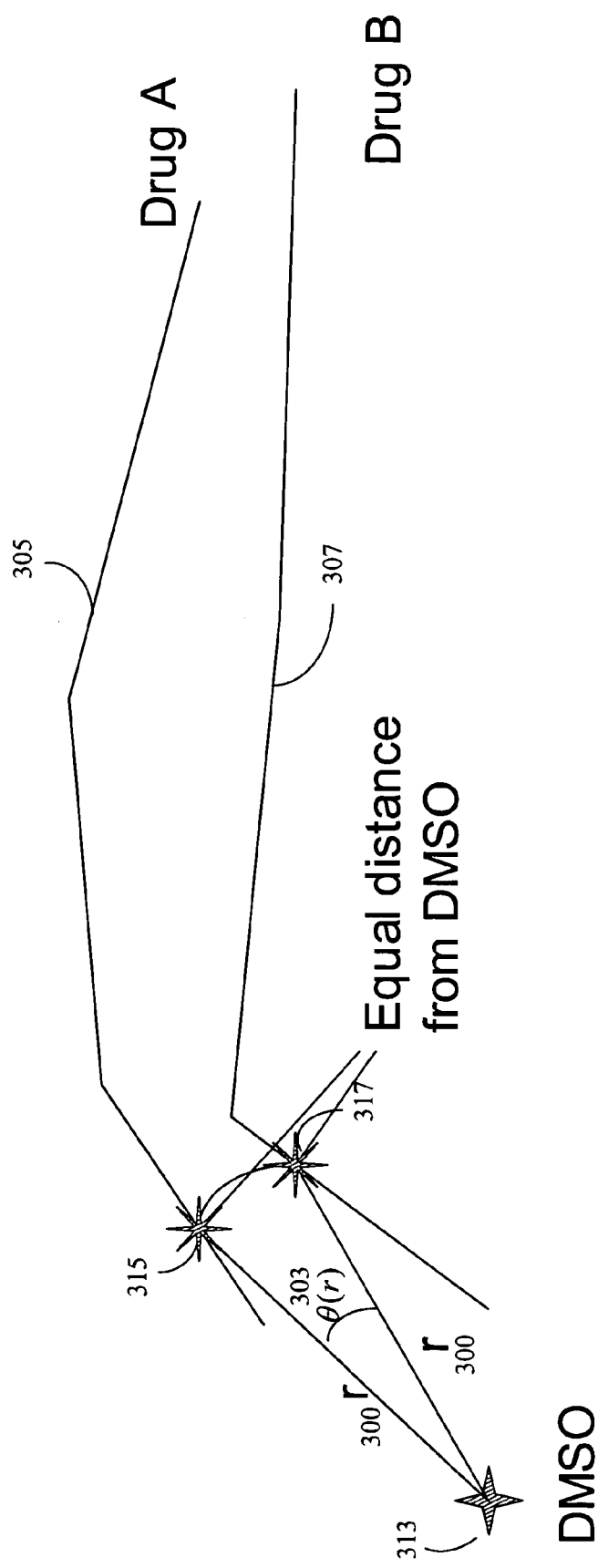
FIG. 3A is a graph showing how the distance from a common negative control point, "r," can be used to identify points on two response paths from which a meaningful measure of "distance" can be computed.

FIG. 3A shows two response paths, a response path 305 and a response path 307, through a biological feature space. These paths describe the dose responses of a Drug A and a Drug B, respectively. The purpose of FIG. 3A is to depict a method of "aligning" these two paths to identify points on the two curves for comparison.

As shown, a common center point 313 is defined for the biological feature space. Generally, the common center for all response paths should be biologically meaningful. It is preferably a point at which no stimulus is applied to the biological systems being characterized; i.e., it is a negative control. For tests on compounds, the negative control may be contact with solvent in the absence of any biologically relevant compound. For many experimental protocols, the solvent is aqueous DMSO. Hence, in FIG. 3A, the common center 313 is labeled "DMSO."

A given radial distance from center point 313 defines a circle or sphere that may intersect multiple stimulus response paths in the biological feature space. As an example consider radial distance 300 shown in Figure A. As shown, radius 300 intersects paths 305 and 307 at points 315 and 317, respectively. Because these points share a common value of r, they are appropriate for calculating a distance between paths 305 and 307. In other words, these two points, which have the same value of r, are used measure distance or similarity.

To calculate distance between these points, one can measure the Euclidean distance between them or an arc length passing through them and centered on the "DMSO" center point. In a preferred approach, the distance is measured in terms of an angle θ between rays from center point 313 and through points 315 and 317. An advantage of using angle in place of arc length or Euclidean distance is that gives a measure that does not increase due to divergence from the center point. So if each path is a straight line, the measured distance will be the same regardless of whether the measurement is made close to the center point or far from the center point. In a related approach, one can compute the inner product of two vectors from the common center, one to a point r distance away in the drug A path and another to a point r distance away on the drug B path. Like angle, inner product gives a measure of similarity in direction of the two vectors, and does not intrinsically increase with distance from the center point.

An expression for angle (θ(r)) is shown below as equation 3. Note that angle is a direct measure of dissimilarity (distance), in that large values of angle indicate that the paths are widely separated. From a mathematical perspective, recognizing that inner product <f1(r), f2(r)> is proportional to cosine θ, one can calculate the angle using an arccosine function of the inner product:

$$\tilde{D}_{f_1,f_2}(r) = \theta(r) = \arccos\left(\frac{<f_1(r), f_2(r)>}{r^2}\right)$$ (Equation 3)

$$= \arccos\left(\frac{\sum_{i=1}^{n} f_1(r)_i f_2(r)_i}{r^2}\right)$$

In this expression, the index "i" represents the dimensions of the biological feature space in which the stimulus response paths are plotted. For example, i=1 might correspond to cell count, i=2 might correspond to mitotic index, and so on. $f_1$ is the expression for the first stimulus response path (as a function of r) and $f_2$ is the expression for the second stimulus response path (also as a function of r).

Inner product is a direct measure of similarity in that large values of inner product indicate that the paths are highly similar. With the cosine of the angle between two vectors (as used in the inner product), orthogonal trajectories are deemed to be extremely dissimilar and consequently have a value of zero. Coincident trajectories are deemed to be the same and have a value of one. The cosine of the angle between two vectors is computed from the inner product as calculated by the following expression:

$$D_{f_1,f_2}(r) = \cos(\theta(r)) = \frac{<f_1(r), f_2(r)>}{r^2}$$ (Equation 4)

$$= \frac{\sum_{i=1}^{n} f_1(r)_i f_2(r)_i}{r^2}$$

To obtain a full comparison of two response curves, one needs more than a simple arc length, angle measure, etc. between two points on those curves. Because, the curve trajectories typically deviate from straight rays, one should calculate the similarity by integrating the distance function over a region of interest between the two-curves. This captures variations in the trajectory with radius, r.

Using the cosine of the angle between two vectors (or inner product) as a measure of similarity, the integral is given by the following expression:

$$D(f_1, f_2) = \frac{1}{r_{max} - r_{min}} \int_{r_{min}}^{r_{max}} D_{f_1,f_2}(r) dr$$ (Equation 5)

$$= \frac{1}{r_{max} - r_{min}} \int_{r_{min}}^{r_{max}} \cos(\theta(r)) dr$$

$$= \frac{1}{r_{max} - r_{min}} \int_{r_{min}}^{r_{max}} \frac{<f_1(r), f_2(r)>}{r^2} dr$$

Note that the factor rmax−rmin in the denominator is employed to make integral value independent of choice of the relative position of the upper and lower bounds (on r) with respect to the common center point. If the factor were not included, the value of the integral would be generally higher for bounds chosen to be relatively far from the common center.

Using the angle as a measure of dissimilarity or separation distance, the integral is given by the following expression:

$$\tilde{D}(f_1, f_2) = \frac{1}{r_{max} - r_{min}} \int_{r_{min}}^{r_{max}} \tilde{D}_{f_1,f_2}(r)\,dr \quad \text{(Equation 6)}$$

$$= \frac{1}{r_{max} - r_{min}} \int_{r_{min}}^{r_{max}} \theta(r)\,dr$$

$$= \frac{1}{r_{max} - r_{min}} \int_{r_{min}}^{r_{max}} \arccos\left(\frac{<f_1(r), f_2(r)>}{r^2}\right)dr$$

The choice of upper and lower bounds for integration should be made in a manner that captures the biologically relevant region of space. In one example, the lower bound is chosen to be at or near a point where the effect in question is first observed and the upper bound is chosen to be at or near a point where the effect saturates (e.g., most or all cells transition to a particular mitotic state or death). Further, the upper bound should generally be within the range where trajectory is still increasing monotonically with respect to radius, r.

It is possible to apply "weights" to the distance function within the bounds of integration. A weighting function may emphasize a region of biological relevance in the similarity calculation. One example of a simple weighting function is a Gaussian distribution centered on a point intermediate between the upper and lower bounds of integration. Other examples of weighting functions can take advantage of the fact that one can have more confidence in experiments having higher numbers of objects. So in a specific example, the weight can be based on the total number of objects. In other cases, the weight could be based on the number of only certain types of objects. For example, if one is interested only in properties of mitotic cells, one could weight based on number of mitotic cells.

A general representation of the similarity integrals with a weighting function is shown below, with the inner product version shown in Equation 7 and the angle version shown in Equation 8.

$$\ddot{D}(f_1, f_2) = \frac{1}{r_{max} - r_{min}} \int_{r_{min}}^{r_{max}} w(r) D_{f_1,f_2}(r)\,dr \quad \text{(Equation 7)}$$

$$= \frac{1}{r_{max} - r_{min}} \int_{r_{min}}^{r_{max}} w(r)\cos(\theta(r))\,dr$$

$$= \frac{1}{r_{max} - r_{min}} \int_{r_{min}}^{r_{max}} w(r)\frac{<f_1(r), f_2(r)>}{r^2}\,dr$$

$$\ddot{D}(f_1, f_2) = \frac{1}{r_{max} - r_{min}} \int_{r_{min}}^{r_{max}} w(r) \tilde{D}_{f_1,f_2}(r)\,dr \quad \text{(Equation 8)}$$

$$= \frac{1}{r_{max} - r_{min}} \int_{r_{min}}^{r_{max}} w(r)\theta(r)\,dr$$

$$= \frac{1}{r_{max} - r_{min}} \int_{r_{min}}^{r_{max}} w(r) \arccos\left(\frac{<f_1(r), f_2(r)>}{r^2}\right)dr$$

In these expressions, the w(r) are the weighting functions. In one sense, Equations 7 and 8 are the general versions of Equations 5 and 6. In Equations 5 and 6, the weighting function, w(r), reduces to a simple step function that has a value of 1 everywhere within the bounds of integration.

Figure 3B:
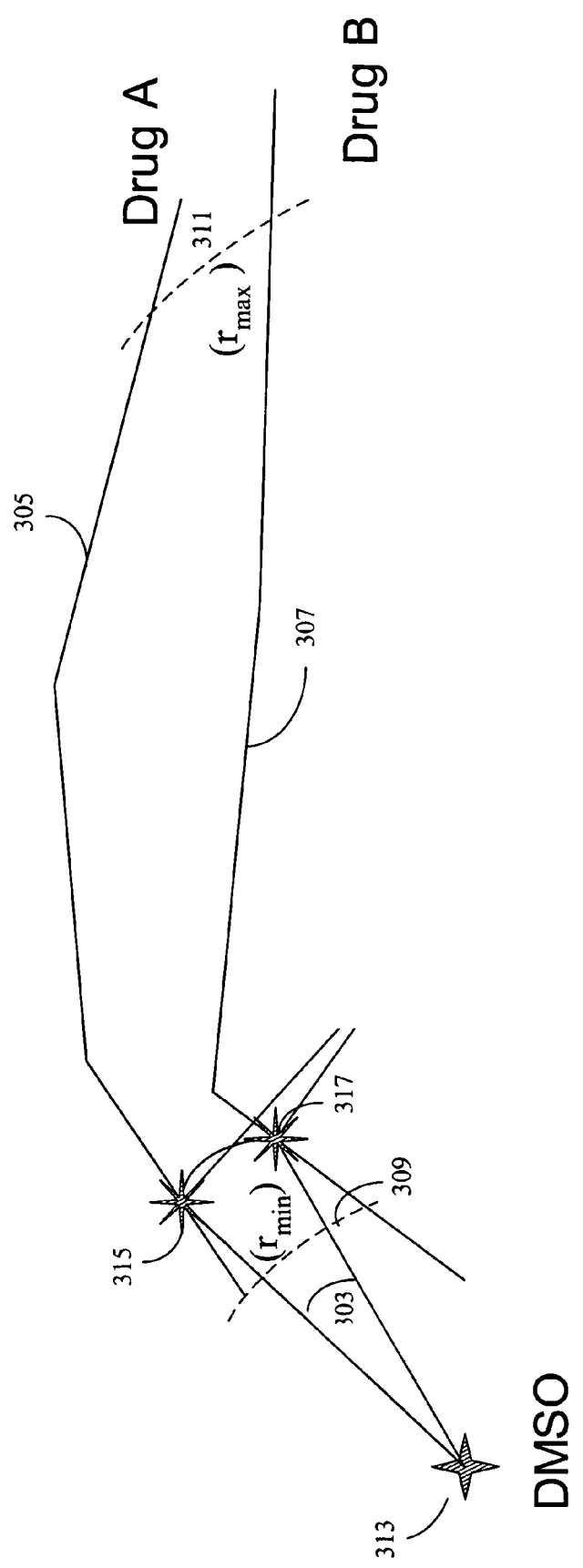
FIG. 3B is a graph showing how "distance" between two response paths can be computed by integrating on "dr" over a range of biological interest.

FIG. 3B shows the dose response curves 305 and 307 for the Drugs A and B as discussed above in connection with FIG. 3A. FIG. 3B, however, also shows the bounds of integration that may be used, in this example, to obtain a measure of distance by using integration. In FIG. 3B, a lower bound of integration 309 is depicted as having a minimum radius (rmin), while an upper bound of integration 311 is depicted as having a maximum radius (rmax). The angular area defined between curves 305 and 307 and within integration bounds 309 and 311 defines the "distance" between Drug A and Drug B.

Applications and Examples of Distance Calculations

FIG. 4A represents a methodology 400 that may be employed to generate a model in accordance with one embodiment of this invention. As used in the context of this method, a model is specified, in part, by a collection of biological features (e.g., mitotic index, cell count, cell shape, etc.) that can effectively discriminate between stimuli of different classes (e.g., mechanism of action or toxicity) based on the shape or location of a response curve trajectory in the space defined by the biological features of the model. In the case of classification by mechanism of action, preferably the biological features of the model allow classification independently of stimulus dose (e.g., concentration).

It is generally necessary to identify a limited set of biological features (and optionally associated weighting functions or factors) for use in a model. In theory, a model could be developed from all or many of the available biological features. But this might include many unnecessary features and unduly complicate the model, thereby unnecessarily increasing consumption of computational resources. For high throughput applications such as screening a library of compounds, an accurate yet streamlined model is required. Generally, accurate models that use the smallest number of features are sought. Classifier models with a small number of features are desirable because they tend to have low correlation with each other and hence may show the predictive structure of the data. They also tend to have true misclassification rates similar to the misclassification rates obtained on the training set. Typically, computation time is not a factor. However, using a fewer number of features is still desirable for at least the reasons described above.

In addition to the limited set of biological features, the model may specify weighting factors or functions to be applied to the biological feature space so that in calculating distance or the integral of distance, some regions of the feature spaces are emphasized in comparison to other regions. This weighting of the features is done when one scales the data (division by the overall standard deviation) and effectively puts all features on equal footing. Division by the standard deviation computed on the controls weights well measured features more than poorly measured features. Note that weighting factors or functions can also favor the contribution of certain biological features over the contributions of other biological features in classification of stimuli (by impacting the distance calculation).

It is important to note that model can be build by selecting some or all features based on prior biological knowledge. If for example, a biologist knows that mitotic index is the most important variable (through prior knowledge or research), mitotic index can be retained as a feature in the model regardless of whether a process such as that shown in FIG. 4A indicates that it should be retained. In another example, the biologist may "know" that mitotic index and proportion of G2 cells will completely describe mechanism of action under consideration. In such cases—which are rare—one need not go through a rigorous analysis to identify which features are to be included in the model.

Turning to the specific operations depicted in FIG. 4A, process 400 begins at a block 403, where it receives a "training set" for model generation. The training set includes response paths for multiple stimuli that have been previously classified by a trustworthy method. For example, the response paths may have been obtained for compounds having known mechanisms of action (e.g., Cox-II inhibition, expression modulation for a particular hormone receptor, blocking the action of an enzyme in a particular metabolic pathway, etc.). As explained above, the response paths are comprised of (or derived from) signatures of the stimuli at various levels or various times.

Initially, in method 400, each signature is a multidimensional vector comprised of values for each biological feature that might potentially be employed in the model. So, in other words, the initial data set (from the training set members) occupies a highly multidimensional space defined by all available biological features. In the end of the process, only some of these features will be selected for the model.

At an operation 405, most or all dimensions (biological features) of the response paths are scaled or normalized to a comparable range of values. In one example, this is accomplished by subtracting the mean value of the group of response paths for a particular biological feature from each of the response paths along this biological feature dimension. Each dimension may be further scaled by dividing the scaled values by a standard deviation for the group of response paths. In this manner, each dimension is placed on a comparable scale of values. In other words, the maximum and minimum values of one dimension will be on the same order of the maximum and minimum values for each other dimension under consideration. The scaling of any value of a particular biological feature (dimension) in operation 405 may be given by the following expression:

$$x_{scaled} = \frac{x_i - \overline{X}}{X_{std.dev.}} \quad \text{(Equation 9)}$$

where $x_i$ is an unscaled value of the biological feature for a particular signature, $x_{scaled}$ is the scaled version of the biological feature, $\overline{X}$ is the mean value of the biological feature across the group of signatures for all stimuli, and $X_{std.dev.}$ is the standard deviation of the biological feature across the group of signatures or the signatures from the negative control. Note that the standard deviation and mean are obtained from all available data values for the dimension (biological feature) under consideration. Generally, though not necessarily, the available data values come from the training set. In some embodiments, the mean and standard deviation can be obtained from the negative control or historical data.

Note that each response curve may take various forms. In the simplest case, it is merely a series of available signatures connected to each other by line segments. More generally, it is a mathematical function of the various biological features that fits the available data. In either case, it is preferably scaled with respect to the negative control, and possibly the standard deviation of the data as described above.

After scaling as appropriate, method 400 chooses a new model for evaluation as indicated at a block 407. Initially, a first combination of features (model) is chosen. In the next iteration, a second model is chosen, and so on.

Note that some selectivity must be exercised in this operation. Otherwise, process 400 might take a prohibitively long period to complete. For example, if the training set is based on 30 biological features, extracted from each of 6 different cell lines, then each signature includes 180 possible features. It would be nearly impossible to consider all possible subsets of these features (each representing a potential model), as there would be more than $10^{54}$ possible combinations. Note that, assuming computation speed of 1,000,000 models per second, it would take $3*10^{40}$ years to consider all of the models. Typical computers today can usually run about 2–3 models per second.

Various techniques may be employed select a limited number of the total number of combinations and do so in a manner ensuring adequate exploration of feature space. Typically, an optimization algorithm begins from a random start and terminates at a local minimum (maximum) with respect to some neighborhood definition. In one example, the optimization algorithm employs a stepwise variable selection. In other words, for a given model of size m, the algorithm tries to add/remove one variable at a time, and find the best model of size m+1 (or m−1). This will not guarantee that the algorithm found the absolute "best" model, but usually it does find very good model. In exploring feature space, it may be desirable to focus on models that have relatively lower numbers of features. While models with large numbers of features generally do a good job of classifying data in a training set, they risk including features that are simply fit to noise in the training set and have no real bearing on the underlying biology. Obviously, the algorithm must specify some sort of "cost" function, which penalizes models based on their misclassification rate. This is the subject of operation 413, discussed below. But it can impact the choice of a new model at 407.

Note that when a given candidate model is chosen, only those biological features employed in the model are considered during the iteration. So the size of the signature vector is typically reduced in some measure. The subsequent operations within the iteration on the chosen model act on the selected features only. All other features are disregarded.

For each chosen model candidate, the method first aligns each of the response paths (one for each member of the training set) to a radius, r, from the common center (negative control point.) See block 409. This operation was described above with reference to FIG. 3A.

For any two response paths, points on paths having an identical value of r from a common center are identified. These points are then used to calculate distance between pairs of response curves. Note that each set of points on the curves sharing a common value of r (i.e., are located the same distance from the common center) can be identified by concentric circles or spheres (or other closed paths) centered at the common center (point of negative control). Note also that if the model applies a weighting factor that favors that contributions of some features over others, then the concentric spheres will be replaced by concentric ellipsoids or other closed shapes.

With the points on the response path for each stimulus of the training set now properly aligned, the method computes the distance between each pair of response paths in the biological feature space of the candidate model under consideration. See block 411. This produces as many distance values as there are pairs of training set members. Preferably, though not necessarily, the distances are computed using one of the techniques described above (e.g., integration of a spherical geometry parameter over r). Specifics examples include integration of the cosine of the angle (and inner product) with a weighting factor (equation 7) or without a weighting function (equation 5), and integration of an angle with a weighting function (equation 8) or without a weighting function (equation 6). Of course, a Euclidean distance between nearest points on the curves might be used in some embodiments. Other distance metrics may also be employed.

The various members of the training set (as represented by the respective response curves) can now be grouped or classified based on the distances computed at block 411. Various classification algorithms may be employed. Some are presented in "The Elements of Statistical Learning, Data Mining, Inference and Prediction," T. Hastie, R. Tibishirani, J. Freidman Springer 2001, which is incorporated herein by reference for all purposes. Examples include Nearest Neighbor methods, Linear Discriminant Analysis, and the like. If the training set is known to contain stimuli that act by eight different mechanisms of action, for example, the classification algorithm may be asked to segregate the response curves into eight different groups (for the current model under consideration). The accuracy of this grouping is then assessed by comparing the grouping to the known mechanisms of action (or other classifications) for the training set members. Good models will have relatively few misclassifications.

As indicated at a block 413, the current model is evaluated with a cost function (or "objective function") that penalizes models having misclassifications. Generally, it is desirable to minimize the cost function (objective function). The cost function is typically a function of the misclassification rate and the number of predictors (variables) in the model. Accordingly, it is often desirable to minimize the two competing criteria the misclassification rate and the number of classifiers. In addition, it may be desirable to apply a penalty based on the size of the model, with models having larger number of variables (features) given higher costs. As explained above, models with large numbers of variables have relatively high risks of including variables that are simply fit to noise in the training set.

After the model under consideration has been evaluated for its ability to classify known stimuli, it is compared against a "previous best" model. See block 415. If the current model does not outperform the previous best model (e.g., it has a higher cost), it is not saved as the best model. If, however, the current model does in fact outperform the previous best model, then the current model replaces the previous best model and all future candidate models are evaluated against it—until a better one is found. Obviously, on the first iteration, there is no previous best model for comparison, so the model under consideration will be saved as the new best model—at least until the next iteration. Note that saving the best model is only one way to proceed. Other embodiments may save all models and simply rank them. At the end of the process, a group of the best models is further evaluated using some other criteria such as the size of the models.

After operation 413, the method determines whether there are any more models left to consider. See decision block 417. If so, the process is directed back to block 407 where the next model is chosen. Thereafter that model is treated in operations 407, 409, 411, 413, and 415 as described above. Ultimately, the last candidate model is considered and decision 417 is answered in the negative. At that point, the model with the lowest cost is identified at 419. This may involve nothing more than retrieving the current best model as stored at 415.

Note that models developed in this way can be validated. Various validation techniques are known to those of skill in the art. Some of these employ test sets that do not overlap with the training set but have known classifications according to criteria such as mechanism of action, and the like. Others employ a "leave one out" technique in which the model is generated from all members of the training set, except one. The resulting model is then assessed on the basis of its ability to properly classify the "left out" member. This process can be repeated numerous times by choosing different training set members to "leave out" during the model generating operation (process 400 for example).

Some or all of the features in the above-described methods may be performed computationally with or without user intervention at particular stages. In one embodiment, all operations are implemented as one or more software routines that can execute to completion without user intervention—except to identify execution variables and initiate the process. In one approach, the user can specify values for variables such as the range of biological features to be considered, the number of features to be included in any of the models, weighting functions applied to any particular features, the type of distance or similarity metric to be used (e.g., Euclidean vs. inner product vs. angle, etc.), the type of cost calculation, etc. Of course, any one or more of these can be set by default.

The feature values and other data required to execute the method can be obtained from any suitable store of such information, regardless of where such information was originally obtained (from within the enterprise generating the model or elsewhere). Suitable system architectures for using methods of this invention are described in PCT Patent Application No. PCT/US02/05266 filed on Feb. 20, 2002 and in U.S. patent application Ser. No. 10/421,625 filed on Apr. 22, 2003, each of which is incorporated herein by reference for all purposes.

FIG. 4B depicts a process 422 that may be employed to classify stimuli of unknown classification using a model. Such model may (or may not) have been generated using process 400 of FIG. 4A. As described above, the model generally specifies multiple biological features, optionally with weighting functions applied, and a method for calculating distance or similarity. The model may also include a collection of response curves in the feature space of interest for previously classified stimuli as described below.

Generally, classification methods of this invention use a "distance" or similarity metric as described above. Preferably, they also employ an alignment with respect to a common center point (e.g., the negative control point) in biological feature space. As explained previously, this alignment is preferably employed to compute distance in a spherical geometry.

As shown, process 422 begins at 425 by receiving the signature or response curve of a stimulus (e.g., a compound in a library). Ideally, the stimulus will be characterized by a response curve including (or derived from) multiple signatures. This is likely to provide a more reliable classification than use of a single signature. However, for many applications, it will not be convenient or possible to obtain so much data. For example, if a library of hundreds or thousands of compounds is being evaluated, the practicality of the research effort may limit the available data to one signature per compound. Note that it may be desirable to perform a preliminary filtering of the data to be classified. In one embodiment, signatures close to a negative control or those with a small number of objects are removed from consideration.

In addition to receiving the signatures or response curves of the unclassified stimulus, the process must have access to a knowledge base (or other suitable repository of response curves for stimuli having known classes. See block 425.

Note that the signature or response curve for the stimulus under consideration is typically provided as raw data or a simple vector of biological feature values (in the case of a single signature). That data must be transformed to a format suitable for classification in the features space of the previously classified response curves. To this end, an operation 427 may scale the data for the stimulus under consideration. This operation may correspond to operation 405 of FIG. 4A. Thus, it may involve subtracting a mean value for each feature of the model and then scaling the resulting difference values by the standard deviations of the features as calculated from data in the knowledge base. In many cases, it will be necessary to "scale" the data of the stimulus under consideration to make a valid comparison with the data in the knowledge base.

At an operation 429, method 422 aligns the curve or signature of the stimulus under consideration with the response curves in the knowledge base. This may be performed in the same manner as described for operation 409 in FIG. 4A. Note that if the stimulus under consideration is to be classified by a technique other than one that relies on spherical geometry (e.g., a technique that relies on the Euclidean distance between a signature and the response curves), then operation 429 is unnecessary and need not be performed.

With the data of the stimulus now scaled and aligned as necessary, its distance to each of the response curves in the models knowledge base can be computed. See block 431. This is done by any suitable technique and is preferably the same technique employed to generate the model. See, for example, block 411 of FIG. 4A.

After distances to each response curve in the model have been computed, method 422 next classifies the stimulus on the basis of these distances. As indicated above, the classification is often based on mechanism of action. One group of response paths corresponds to a first mechanism of action and another group of response paths corresponds to a second mechanism of action. See operation 433. Generally, this will involve classification by distance to a cluster occupied by group of response curves having a common mechanism of action (or other classification) belonging to the same class. For example, the classification may be based on the minimum or maximum distance to any member of the group or on an average distance to all members of the group. Generally, the stimulus under consideration is simply classified with the group to which it is closest. Those of skill in the art are aware of various techniques for accomplishing this classification. Variations in the available techniques arise from the ways in which "closeness" to a group is defined. It can be defined based on the center of the group, the closest edge of the group, etc.

Figure 5A:
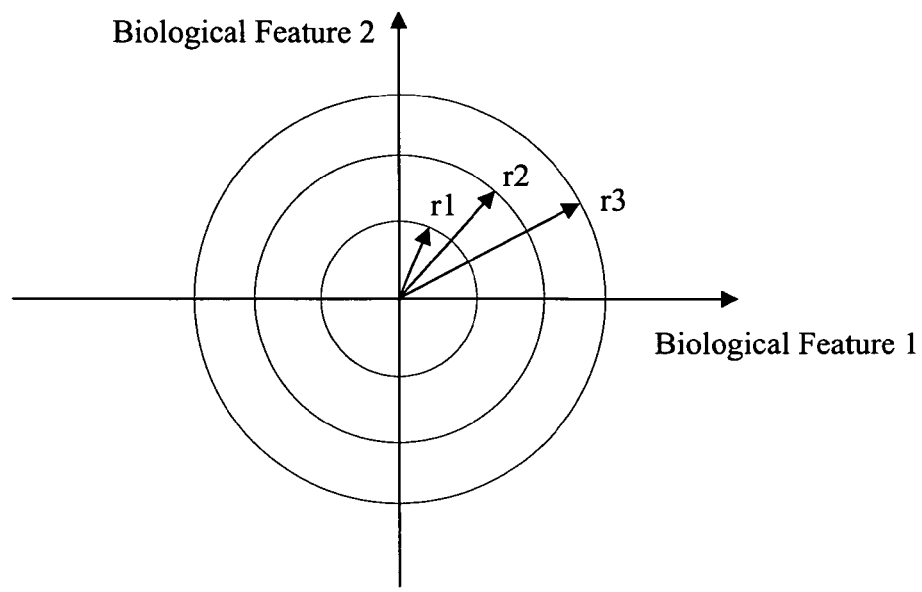
FIGS. 5A and 5B show topologies for the unweighted case (FIG. 5A) and the weighted case (5B) of biological feature space for distance calculations in accordance with certain embodiments of this invention.
Figure 5B:
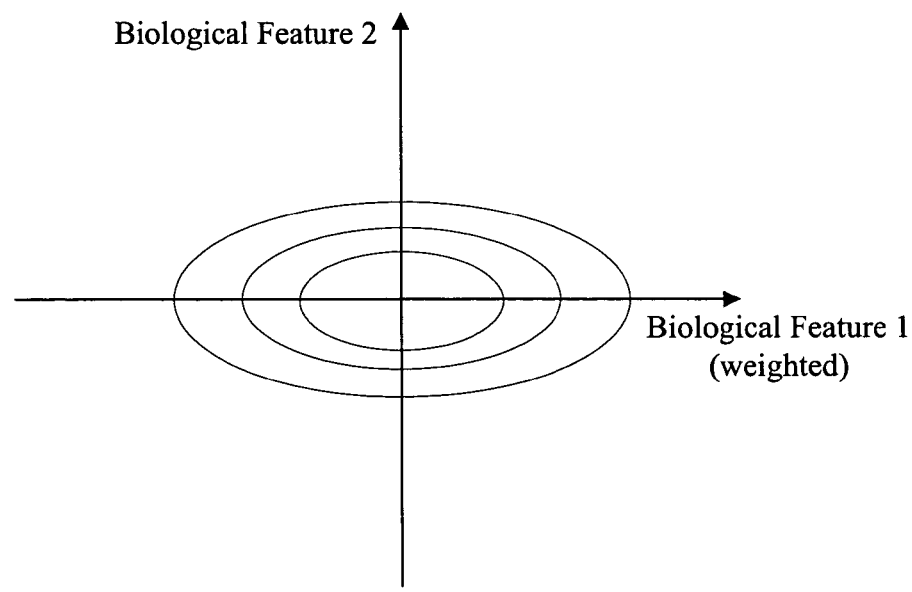

As noted above with respect to operation 409 of FIG. 4A, a model may weight different biological features differently. This affects the alignment calculation. In other words, the contributions of the various biological features to selection of points on a response curve for distance calculations will be skewed by the weighting. This concept is illustrated in FIGS. 5A and 5B, where example topologies for the unweighted case (FIG. 5A) and the weighted case (5B) are shown for 2-dimensions of biological feature space.

Note that in an alternative embodiment, the model contains a biological feature space divided into multiple regions, each associated with a different classification. The process then simply determines which region the stimulus under investigation falls into. The regions of the biological feature space were previously identified using the response curves of the training set as described above.

As indicated, operation 433 classifies a stimulus based on distances between the signature or path of the stimulus and the signature or paths of previously classified stimuli. This operation may be performed in a variety of ways. A few suitable approaches will now be described. Each involves computing a "distance" between two or more points or paths in biological feature space using a nearest neighbor technique. Other techniques employing alignment and or integration as described above with reference to FIGS. 3A and 3B may also be used.

In the nearest neighbor approach, if the stimulus to be classified is represented by a signature, two different classification methods may be used. The first uses a distance between signatures and the second uses a distance between a signature and a stimulus response path. The distance between a signature and a response path is the defined as the shortest distance between them.

The first method is the standard nearest neighbor algorithm. Distances are computed between a signature and all previously classified signatures in the knowledge base (e.g., signatures from training set). The signature is assigned to the most prevalent classification among the K closest signatures in the knowledge base. The parameter K is typically 1 to 10 or larger depending on the size of the knowledge base. During this computation the distances, $d_{ij}$, from signature i to the signature j in the knowledge base are saved. These distances may be used to break ties in choosing the most prevalent classification in the K nearest signatures. If there is no knowledge base, all pairwise distances between signatures can be computed. These distances can then be used as inputs to well known clustering algorithms.

This second method is similar to the first method with signatures in the knowledge base replaced with response paths in the knowledge base. It starts by computing the shortest distance between a signature and all response paths in the knowledge base. The signature is assigned to the most prevalent classification among the K response paths with the shortest distance to the signature. Again, the parameter K depends on the size of the knowledge base, with 1–10 being typical. During this computation the distances, $d_iJ$, from signature i to the response path J are saved. These distances may be used to break ties in choosing the most prevalent classification in the K nearest response paths. If there is no knowledge base, all distances between signatures and response paths can be computed. These distances can be used to compute dissimilarities between response paths as explained in the next paragraph.

In a related approach, a response path is classified based on its proximity to other response paths in the knowledge base. This method classifies a response path based on the nearest neighbor classification of its signatures. The simplest method is to assign a response path to the most prevalent classification of its signatures. For example if A, B and C represent distinct classifications and a response path consists of eight signatures with classifications (A,C,B,B,B,B,B,C) the method will assign the response path to classification B. Several variants of this procedure are possible. The distances, $d_{ij}$ or $d_iJ$ can be used as weights in this voting. Also weights must be computed based on continuity of a classification for example (C,A,A,B,B,B,A,C) might be assigned to B while (C,B,A,B,A,B,A,C) is not assigned.

According to another method, classifications including, but not limited to, nearest neighbors, K-medoids and hierarchical clustering can be used to classify response paths with respect to other response paths. A dissimilarity measure from response path I to response path J can be computed as $$D_{IJ} = \sum_{k=1}^{n} w_k d_{iJ}$$

where $w_k$ are positive weights that sum to 1 and n is the number of signatures. Since $D_{IJ}$ does not necessarily equal $D_{JI}$ we may choose to use $D^*_{JI}=(D_{JI}+D_{IJ})/2$ which is symmetric in I and J. The paradigm above can be generalized to include points on the response path in addition to or instead of the observed signatures.

Off Target Embodiment

One embodiment of the present invention involves measuring distances from "well-behaved" compounds in an effort to identify stimuli likely to have "side effects." In the context of this embodiment, "well-behaved" stimuli are those that have few side effects. These stimuli may be characterized as having primarily only "on target" effects. Side effects are deemed "off target" effects. Using this invention, the response paths of well-behaved stimuli are provided in an off target biological feature space comprised of dimensions that highlight off target effects. Stimuli showing promising on target effects are tested against biological systems that provide data for signatures in the off target biological feature space. The signatures or response paths of these stimuli are then compared to those of the well-behaved compounds. Stimuli having signatures or response paths separated from those of the well-behaved stimuli are suspect. They have significant side effects. On the other hand, stimuli having signatures or response paths that closely coincide with those of the well-behaved stimuli are more likely to be free of significant side effects.

Distances are computed as described above. Hence the principles described above are used to identify stimuli having off target effects. One simply has to choose the dimensions of biological feature space that highlight off target effects and in addition identify a region or regions of such space associated with well-behaved stimuli that have few if any off target effects.

The relevance and application of off target effects in the context of phenotypic analysis are described in U.S. patent application Ser. No. 10/621,821, filed Jul. 16, 2003, and titled "Methods and Apparatus for Investigating Side Effects," which was previously incorporated by reference.

A measure of off target effects is beneficial because most investigations of new chemical entities (or other stimuli) tend to focus only on the effect that the investigation is intended to elucidate (i.e., the "on-target effect"). Unfortunately, in some circumstances, while the effect that is under investigation could be found to be beneficial, the side effects could be found to be harmful. An example of a drug which can have some negative side effects not detected during the drug development or approval stages would be thalidomide. Similarly, while an investigation may indicate that a treatment has no efficacy for a first condition, or is in fact harmful, it is possible that the treatment could have effects other than the on-target effect, that is side effects (herein "off-target effects") which could be beneficial. Hence some method by which a treatment can be more fully investigated or characterized would be beneficial.

As indicated above, the stimulus applied to the cells can take many forms. In an embodiment of the invention, it can have a known or an intended effect, or an effect which it is intended to investigate, upon the cells. For example the treatment can be intended to affect a particular biological process or component of the cells. The intended effect can already be known, through previous assays of the treatment, or alternatively, an investigation can be an initial one in which an intended effect on the cell is known, e.g. mitotic arrest, but the extent to which the treatment results in that effect may be unknown. Nonetheless, there is some first or intended effect on the cells, which the treatment has, is believed to have or may have. This intended effect is the "on-target" effect and generally means an expected or intended effect under investigation for the treatment on cells. The on-target effect need not be the dominant effect of the treatment on the cells but is the effect targeted for investigation.

The investigation may evaluate the extent to which the treatment affects the on-target effect, in a quantitative way. For example, if mitotic arrest of cells is the on-target effect or property, then a cellular feature, or group of cellular features, which are characteristic of that effect and which can be used to indicate the extent of that effect, is the size and intensity of the DNA regions in the cells or other features relating to size and intensity, as, in general, mitotic arrest causes an area occupied by nuclear DNA to decrease in size. Therefore the area occupied by nuclear DNA in the treated cells is a cellular feature, which is related to the on-target effect of interest. Other cellular features, relating to the nuclear DNA, are also cellular features, which are related to the on-target effect. For example the perimeter of the region occupied by nuclear DNA, the nuclear DNA form factor and other metrics relating to the morphology or texture of nuclear DNA could also be used as cellular features related to the on-target effect.

There will likely be other cellular features of cell components which are involved in or relate to mitotic arrest and which will also be affected by the treatment and so change. Therefore, from the set of all cellular features, there will be a subset, which relate to mitotic arrest (the on-target cellular features). Therefore using a one or a combination of the on-target cellular features, the effect of the treatment on the on-target effect can be evaluated.

As well as producing the on-target effect, the treatment may have a one or a number of side effects or "off-target" effects on the cells. For example, as well as a treatment causing mitotic arrest, the same treatment may also cause the breakdown of the actin cytoskeleton, or a Golgi apparatus in interphase cells. This breakdown may be a more or a less dominant effect of the treatment than mitotic arrest, but nonetheless it can be considered to be a "side effect" or "off-target effect" as it is not the intended or targeted effect (which in this example is mitotic arrest) of the treatment under investigation.

For any treatment, there will likely be a number of cellular features relating to a cell or cell components which are related to the side or off-target effect or effects. For example cellular features relating to or characteristic of the Golgi apparatus can be used to determine the extent of the off-target effects of the treatment on proteins involved in the maintenance of the Golgi, which are not involved in mitotic arrest. Therefore, there will be a number of cellular features which are affected by the treatment, but which are not related to the on-target effect. One, some or all of those cellular features can be considered off-target cellular features which can be used in a biological feature space to evaluate the extent of the effect of the treatment on off-target effects.

It is envisaged that there may be one or more side or off-target effects and that different groups of off-target cellular features may be used in order to evaluate or assess the effect of the treatment on the multiple side effects. In some instances, the side effect may be toxicity. However, in general, the side or off-target effects of a treatment can be any effect on cellular proteins which are not related to the intended or on-target effect under investigation.

By evaluating both the on-target and off-target effects of the treatment, a better characterization of the treatment on the cells can be obtained. Conventional, investigations have tended to focus on the single intended effect of a treatment and side effects have not been systematically evaluated in order to better characterize the overall effect of the treatment of the cells. For instance, a treatment may have a high an efficacy as a mitotic arrest agent but may also be highly toxic and result in significant cell death. Therefore, an investigation which evaluates the affect on mitotic arrest alone, would not necessarily highlight this important and potentially harmful side effect. Therefore, the methods of this embodiment allow a better characterization of the overall affect of the treatment by considering the intended effect and also evaluating side effects.

Further, it has been found that different dose levels and experimental protocols can result in different levels at which the intended and side effects occur. Appropriate dose levels can be determined at which the desired effects are increased and the harmful effects are reduced, which otherwise would not be identified in the absence of information as to the extent of any side effects. It will be appreciated that the on-target effect is not limited to being a beneficial effect and can be a beneficial or harmful effect on the cells, and similarly the off target effect is not limited to being a harmful effect and may also be beneficial or harmful, depending on the context of the overall investigations.

Selecting Experiments for Providing Response Paths

Initially, a relevant collection of stimuli for consideration in the analysis must be selected. As mentioned, the stimuli suitable for use with this invention span a wide range of physical agents, forces, fields, etc. Generally, the collection of stimuli chosen for a particular analysis may be selected with no prior assumptions. More often, the stimuli are selected because they are believed to have related and interesting effects on cells. In the case of potential therapeutic compounds, a number of chemical compounds may be selected because they are believed to have a similar mechanism of action when applied to particular cells. For example, compounds may be selected because they are believed to possess anti-mitotic properties when applied to cancer cells.

The data used for the analysis of the invention may be derived from a wide range of experiments. Such experiments typically span a matrix of experimental conditions. Such matrix may include experimental variations in the choice of stimulus, the level of each stimulus, the cell lines to which the stimulus is applied, and the particular components within a cell line that are analyzed. As suggested above, multiple compounds may be applied in multiple concentrations to multiple cell lines. For each combination of compound, dose, and cell line, multiple images may be obtained. Each such image contains information about a separate component/marker combination within the cell. Note that the invention is not limited to this wide-ranging matrix. At its essence, the invention simply involves considering a single stimulus at multiple levels. Of course, each such level may provide multivariate data about a cell phenotype. However, it is unnecessary to employ multiple cell lines and/or multiple cellular components in generating the relevant multivariate data.

The component/marker combinations used in a particular study should be chosen based upon the area of interest. For example, oncology investigations may require a different set of markers than cardiovascular investigations. Further, the choice of markers should vary over a range of cell biology. For example, it typically would be unnecessary to choose two separate markers that both image microtubules. Depending upon the application, the markers can have a very high degree of specificity, as in the case of an antibody for tubulin or a lower degree of specificity, as in the case of lectins. Note that some lectins, such as Lens culinaris (LC) lectin actually binds to various polysaccharides. Because most of the time these polysaccharides components are enriched in the Golgi, LC lectin still can be an effective marker for Golgi.

Generally, cell components tracked in presently preferable embodiments can include proteins, protein modifications, genetically manipulated proteins, exogenous proteins, enzymatic activities, nucleic acids, lipids, carbohydrates, organic and inorganic ion concentrations, sub-cellular structures, organelles, plasma membrane, adhesion complex, ion channels, ion pumps, integral membrane proteins, cell surface receptors, G-protein coupled receptors, tyrosine kinase receptors, nuclear membrane receptors, ECM binding complexes, endocytotic machinery, exocytotic machinery, lysosomes, peroxisomes, vacuoles, mitochondria, Golgi apparatus, cytoskeletal filament network, endoplasmic reticulum, nuclear membrane, proteosome apparatus, chromatin, nucleolus, cytoplasm, cytoplasmic signaling apparatus, microbe specializations and plant specializations.

The following table illustrates some cell components and markers (labeling agents) that may be used in embodiments of the present invention. Other markers can be used in various embodiments without departing from the scope of the invention.

| Cell component | Marker or Component | Disease State |
| --- | --- | --- |
| Plasma membrane (including overall cell shape) | Carbocyanine dyes Phosphatidylserine Various lipids Glycoproteins | Apoptosis-Cancer Apoptosis-Neural degenerative Ds |
| Adhesion complexes | Cadherins Integrins Occludin Gap junction ERM proteins CAMs Catenins Desmosomes | Thrombosis Metastasis Wound healing Inflammatory Ds Dermatologic Ds |
| Ion Channels and Pumps | Na/K Atpase Calcium channels Serotonin reuptake pump CFTR SERCA | Cystic fibrosis Depression Congestive Heart Failure Epilepsy |
| G coupled receptors | β adrenergic receptor Angiotensin receptor | Hypertension Heart Failure Angina |
| Tyrosine kinase receptors | PDGF receptor FGF receptor IGF receptor | Cancer Wound healing Angiogenesis Cerebrovascular Ds |
| ECM binding complexes | Dystroglycan Syndecan | Muscular Dystrophy |
| Endocytotic machinery | Clathrin Adaptor proteins COPs Presenilins Dynamin | Alzheimer's Ds |
| Exocytotic machinery | SNAREs Vesicles | Epilepsy Tetanus Systemic Inflammation Allergic Reactions |
| Lysosomes | Acid phosphatase Transferrin Lysotracker Red | Viral diseases |

-continued

| Cell component | Marker or Component | Disease State |
|---|---|---|
| Peroxisomes/ Vacuoles | | Neural degenerative Ds |
| Mitochondria | Caspases | Apoptosis |
| | Apoptosis inducing factor | Neural degenerative Ds |
| | F1 ATPase | |
| | Fluorescein | Mitochondrial Cyto- pathies |
| | Cyclo-oxygenase | |
| | Mitotracker Red | Inflammatory Ds |
| | Mitotracker Green | Metabolic Ds |
| Golgi Apparatus | Lens culinaris lectin | |
| | DiOC6 carbocyanine dye | |
| | COPs | |
| | Antibodies specific for Golgi | |
| Cytoskeletal Filament Networks | Microtubules | Cancer |
| | Actin | Neural degenerative Ds |
| | Intermediate Filaments | |
| | Kinesin, dynein, myosin | Inflammatory Ds |
| | Microtubule associated proteins | Cardiovascular Ds Skin Ds |
| | Actin binding proteins | |
| | Rac/Rho | |
| | Keratins | |
| | GFAP | |
| | Von Wiltbrand's factor | |
| Endoplasmic Reticulum | SNARE | Neural degenerative Ds |
| | PDI | |
| | Ribosomes | |
| Nuclear Membrane | Lamins | Cancer |
| | Nuclear Pore Complex | |
| Proteosome Apparatus | Ubiquityl transferases | Cancer |
| Chromatin | DNA | Cancer |
| | Histone proteins | Aging |
| | Histone deacetylases | |
| | Telomerases | |
| Nucleolus | Phase markers | |
| Cytoplasm | Intermediary Metabolic Enzymes | Cancer |
| | BRCA1 | |
| Cytoplasmic Signaling Apparatus | Calcium | Cardiovascular Ds |
| | Camp | Migraine |
| | PKC | Apoptosis |
| | pH | Cancer |
| Microbe Specializations | Flagella | Infectious Ds |
| | Cilia | |
| | Cell Wall components: Chitin synthase | |
| Plant specializations | Choloroplast | Crop Protection |
| | Cell Wall components | |

In one preferred embodiment, the cellular components considered in separate images include one ore more of DNA, cytoskeletal proteins, and Golgi. In a specific embodiment, the images for each combination of cell line, dose, and compound include a DNA image, a tubulin image, and a Golgi image. Various markers can be used for each of these components. In a preferred embodiment, the DNA marker is DAPI, the tubulin marker is an antibody specific for tubulin, and the Golgi marker is LC lectin.

In one specific approach, the above three markers are analyzed using two separate processes. In a first process, a cell line is simply stained with a marker for DNA. In a second run, the cell line is stained with all three markers. The first process run is used to simply identify cell cycle information. For example, this run is used to determine the proportion of cells in each separate phase of the cell cycle (G1, S, G2, M, and/or various subphases of M). The two process runs are employed because imaging tubulin and Golgi require repeating washing of the cells. This process selectively causes some cells to wash away; specifically rounded up and mitotic cells. Therefore, the remaining cells imaged for tubulin and Golgi are biased toward interphase states.

Regarding the doses or "levels" of the various stimuli, one should endeavor to choose a range of doses that define and active zone for affecting phenotype in a cell line of interest. In one approach, researchers perform a preliminary experiment with each drug. The preliminary experiment may involve titration across a wide range of concentrations. The titration may measure cell count or other appropriate biological parameter. An upper boundary of the active zone may be a concentration at which further increases of concentration have no additional affect on the cells. For example, the upper boundary may be the minimum concentration at which all cells are killed. A lower bound of the active zone is the lowest concentration at which some biological effect can be observed.

In some cases, the highest dose allowed by the process is governed by some physical parameter such as the maximum solubility of a compound. Alternatively, it may be governed by the maximum volume of a compound solution that can be administered to a well without having the solvent significantly affect the cells.

In a preferred embodiment, a highest level of the stimuli is first identified by some technique. Then, additional lower level of the stimulus are identified by incremental reductions. For example, in the case of a chemical compound, serial dilutions may be performed to generate lower level doses. At a minimum, at least two levels of the stimulus must be considered. Preferably significantly more levels are considered. In a preferred embodiment, at least five separate stimulus levels are considered. In a specific preferred embodiment, eight separate levels are considered. If a chemical compound serves as the stimulus, then the highest concentration of the compound should be at least about two times that of the lowest concentration.

As indicated, phenotypic vectors for given stimuli and level combinations may include multivariate information taken from different cell lines. However, this need not be the case, as all the multivariate data of interest may be obtained from a single cell line. Generally, a researcher will chose one or a range of cell lines that are relevant to the area of interest. For example, if the researcher focuses on oncology applications, the cell lines chosen may include different types of cancers and possibly other cells lines that allow one to identify typical side effects of anti cancer drugs. In one specific embodiment pertaining to oncology, six different cell lines are considered. These include HUVEC (human umbilical vein endothelial cells), A498, A548, SF268, SKOV3, and DU145.

Imaging

As indicated, the phenotypic data characterizing each point on a response curve is derived, at least in part, from images of cell lines exposed to particular combinations of stimulus type and stimulus level. See block 109 in FIG. 1, for example. Various techniques for preparing and imaging appropriately treated cells are described in U.S. patent application Ser. Nos. 09/310,879, 09/311,996, and 09/311,890, previously incorporated by reference. In the case of cells treated with a fluorescent marker, a collection of such cells is illuminated with light at an excitation frequency. A detector is tuned to collect light at an emission frequency. The collected light is used to generate an image, which highlights regions of high marker concentration.

Additional operations may be performed prior to, during, or after the imaging operation (109) of FIG. 1. For example, "quality control algorithms" may be employed to discard image data based on, for example, poor exposure, focus failures, foreign objects, and other imaging failures. Generally, problem images can be identified by abnormal intensities and/or spatial statistics.

In a specific embodiment, a correction algorithm may be applied prior to segmentation to correct for changing light conditions, positions of wells, etc. In one example, a noise reduction technique such as median filtering is employed. Then a correction for spatial differences in intensity may be employed. In one example, the spatial correction comprises a separate model for each image (or group of images). These models may be generated by separately summing or averaging all pixel values in the x-direction for each value of y and then separately summing or averaging all pixel values in the y direction for each value of x. In this manner, a parabolic set of correction values is generated for the image or images under consideration. Applying the correction values to the image adjusts for optical system non-linearities, mis-positioning of wells during imaging, etc.

The production of the images includes cell plating, compound dilution, compound addition and imaging focusing. Failures in any of these systems can be detected by a variety of methods. For example, cell plating could fail because of a clogged tip in a delivery pipette. Such failure can be identified by adding a fluorescent dye or bead to the cell suspension. The fluorescence of this dye or bead is chosen to be at a different channel (wavelength) than the markers used to image cellular components. Another potential failure could occur during compound delivery. To detect such failures, one can add a fluorescent dye or bead in the compound plate before compound dilution. The amount of fluorescent dye or bead is proportional to the amount of compound. Yet another potential problem occurs when the focus of the image acquisition system changes during imaging. To account for such spatial biases, one can employ control wells containing, for example, cells with no or neutral compounds interspersed throughout the plate. Still another problem results from foreign objects (e.g., small dust particles) in the well. This can be addressed with image segmentation and statistical outlier identification techniques.

Generally the images used as the starting point for the methods of this invention are obtained from cells that have been specially treated and/or imaged under conditions that contrast the cell's marked components from other cellular components and the background of the image. Typically, the cells are fixed and then treated with a material that binds to the components of interest and shows up in an image (i.e., the marker). Preferably, for example, the chosen agent specifically binds to DNA, but not to most other cellular biomolecules.

Multivariate Phenotypic Data from Images

At every combination of dose, cell line and staining protocol, one or more images can be obtained. As mentioned, these images are used to extract various parameter values of cellular features of relevance to a biological, phenomenon of interest. Generally a given image of a cell, as represented by one or more markers, can be analyzed in isolation or combination with other images of the same cell, as represented by different markers, to obtain any number of image features. These features are typically statistical or morphological in nature. The statistical features typically pertain to a concentration or intensity distribution or histogram.

Some general feature types suitable for use with this invention include a cell, or nucleus where appropriate, count, an area, a perimeter, a length, a breadth, a fiber length, a fiber breadth, a shape factor, a elliptical form factor, an inner radius, an outer radius, a mean radius, an equivalent radius, an equivalent sphere volume, an equivalent prolate volume, an equivalent oblate volume, an equivalent sphere surface area, an average intensity, a total intensity, an optical density, a radial dispersion, and a texture difference. These features can be average or standard deviation values, or frequency statistics from the parameters collected across a population of cells. In some embodiments, the features include features from different cell portions or cell lines.

Examples of some specific cellular features that may be extracted from captured images and used in multivariate response paths of this invention are included in the following table. Other features can be used without departing from the scope of the invention.

| Name of Parameter | Explanation/Comments |
|---|---|
| Count | Number of objects |
| Area | |
| Perimeter | |
| Length | X axis |
| Width | Y axis |
| Shape Factor | Measure of roundness of an object |
| Height | Z axis |
| Radius | |
| Distribution of Brightness | |
| Radius of Dispersion | Measure of how dispersed the marker is from its centroid |
| Centroid location | x-y position of center of mass |
| Number of holes in closed objects | Derivatives of this measurement might include, for example, Euler number (= number of objects − number of holes) |
| Elliptical Fourier Analysis (EFA) | Multiple frequencies that describe the shape of a closed object |
| Wavelet Analysis | As in EFA, but using wavelet transform |
| Interobject Orientation | Polar Coordinate analysis of relative location |
| Distribution Interobject Distances | Including statistical characteristics |
| Spectral Output | Measures the wavelength spectrum of the reporter dye. Includes FRET |
| Optical density | Absorbance of light |
| Phase density | Phase shifting of light |
| Reflection interference | Measure of the distance of the cell membrane from the surface of the substrate |
| 1, 2 and 3 dimensional Fourier Analysis | Spatial frequency analysis of non closed objects |
| 1, 2 and 3 dimensional Wavelet Analysis | Spatial frequency analysis of non closed objects |
| Eccentricity | The eccentricity of the ellipse that has the same second moments as the region. A measure of object elongation. |
| Long axis/Short Axis Length | Another measure of object elongation. |
| Convex perimeter | Perimeter of the smallest convex polygon surrounding an object |
| Convex area | Area of the smallest convex polygon surrounding an object |
| Solidity | Ratio of polygon bounding box area to object area. |
| Extent | proportion of pixels in the bounding box that are also in the region |
| Granularity | |
| Pattern matching | Significance of similarity to reference pattern |
| Volume measurements | As above, but adding a z axis |
| Number of Nodes | The number of nodes protruding from a closed object such as a cell; characterizes cell shape |
| End Points | Relative positions of nodes from above |

The features used in the actual points comprising a response path of this invention may be directly extracted from the images or they may be biological characterizations derived from the features. Note that the points may also include some features that were not directly or indirectly obtained from the images. For example, the points may include information obtained from public sources such as databases, literature, etc. Further, the features comprising the points may include non-image related data, such as data obtained from chemical and biological assays.

Often the features are chosen based upon a biological understanding. For example, if a cell's state in the cell cycle is important to the biological problem being investigated, then features that characterize the amount of DNA in a cell and/or the degree of condensation of that DNA into chromosomes is relevant. In a specific example, cell cycle features include the total quantity of DNA in a nucleus, the area of the nucleus, and the intensity variance of the cellular DNA. A full discussion of the relevant features for characterizing the cell cycle is presented in U.S. patent application Ser. No. 09/729,754, previously incorporated by reference.

Similarly, if an objective is to characterize the Golgi in a cell, this can be accomplished with features that define the location of the Golgi with respect to the nucleus, describe the texture of the Golgi and describe the local concentration of Golgi components. The full discussion of the features relevant in characterizing Golgi is presented in U.S. patent application Ser. No. 09/792,012, previously incorporated by reference. Of specific interest, the Golgi complex in a perinuclear region may be characterized using features such as the mean, standard deviation, and kurtosis of pixel intensity, and various eigenvalues obtained by singular value decomposition of a pixel intensity matrix for the Golgi marker. From these features, the Golgi complex of a given cell may be characterized as normal, diffused, dispersed, or dispersed and diffused.

Further, if the cell shape provides further relevant phenotypic data, then features can be chosen accordingly. In one embodiment, a tubulin or other cytoskeletal component is marked and imaged to provide features relevant to cell shape. Specific examples of such features include the number of nodes on a cell image, the distance between end point of those nodes, a coefficient of tubulin polymerization (e.g., average pixel intensity of object pixels in a tubulin channel), averaged across all cells in a population, and a coefficient of microtubule reorganization (e.g., standard deviation of wavelet coefficients), averaged across all cells in a population. A full discussion of features relevant to characterizing cell shape can be found in U.S. patent application Ser. No. 09/792,013, previously incorporated by reference.

While a fundamental biological understanding can often direct one to the appropriate choice of features for use in this invention, a systematic analysis of data (as described above in the context of FIG. 4A, for example) can help identify features that might not be immediately apparent. Such analysis can be conducted in a manner that finds features that are best able to show subtle differences in the response path. By considering the effect of varying a single feature at a time, one can quickly home in the most relevant parameters for developing response curves in accordance with this invention.

Visualization and Comparison of Response Paths

Lists of stimuli and associated quantitative phenotypes may be stored as database records or other data structures that can be queried or otherwise accessed as part of an analysis procedure. As indicated, the stimuli may be associated with other relevant data such as clinical toxicity, cellular toxicity, hypersensitivity, mechanism of action, etc. (when available). The stored phenotypic data is used to generate and depict response paths.

Various techniques may be employed to visualize the response paths generated as described above. In order for a human observer to make visual comparisons, the space in which the response paths are presented should be comprehendible. Note that for complicated quantitative phenotypes representing individual points on the path, there may be very many separate variables (60 or 180 in the examples above). In principle, each of these variables represents a separate dimension. So one may be confronted with a 60 dimensional space, for example. Obviously, it becomes difficult to visualize meaningful trends or clusters in high dimensional space. Consider the problem of trying to visualize a trend in phenotypes comprised of three cellular components (e.g. tubulin, DNA and Golgi), each of which has multiple relevant parameters (e.g. total quantity of DNA and variance in the concentration of DNA). Obviously, there are more than three relevant dimensions to be considered in analyzing such phenotypes.

One possible solution to the problem involves selecting two or three dimensions (features) that are expected to be most relevant to a particular response curve. Unfortunately, this greatly limits the ability to view response paths where there are many potentially meaningful phenotypic features.

Various techniques may be employed to address this problem. Such techniques create a lower dimensional space in which the individual dimensions capture two or more features of the data. Examples of such techniques include principle component analysis, linear and non-linear discriminant analysis, multidimensional scaling, and projection pursuit techniques. A particularly preferred approach involves the use of principle component analysis. Principle component analysis determines the vectors (dimensions) through which a data set shows the greatest variation in multidimensional space. The first principle component shows the direction of greatest variation in the data. The second principle component shows the direction of the second greatest variation in data and so on. One can select as many principle components as are suitable to depict one's data. Typically, the first one, two, or three principle components are selected for presenting data to human observers. Principal component analysis is described more fully in Jackson, J. E. (1991) A User Guide to Principal Components. New York: John Wiley and Sons; and Jolliffe, I. T. (1986) Principal Component Analysis. New York: Springer-Verlag, both of which are incorporated herein by reference for all purposes.

Various commercially available tools for performing principle component analysis are available. One suitable statistical computing package for performing PCA is available from Insightful Corporation (formerly MathSoft) of Seattle, Wash. Principal component analysis can be applied to quantitative phenotypic data sets in a straight-forward manner. However, it will generally be necessary to standardize phenotypic data sets before submitting them to principle component analysis. This is because the various scalars that comprise the individual features of a quantitative phenotype reside on vastly different scales. For example, the mitotic index will range from zero to one hundred percent, while the size of the nuclei, average ellipsicity of the nuclei, average pixel intensity of the tubulin marker, etc. each have very different scales and associated units. To bring these various features onto a comparable scale for meaningful PCA analysis, one may perform transformations to standardize the data. In one preferred embodiment, each of the dimensions is scaled by considering all the data along that dimension (e.g., all values of nucleus area), subtracting the mean of that data and dividing by the standard deviation. This effectively scales the data for standardization.

After PCA is performed by a suitable tool, the results should be presented graphically. Various graphical tools are suitable for this purpose. One is provided by S+ Corporation. Another particularly useful graphical depiction tool is Spotfire.net available from SpotFire, Inc. of Cambridge, Mass. Any of these tools will not only present the data in principle component space, but will also identify which variables (features) contribute the most to each of the principle components. Because the present invention is concerned primarily with paths, the graphical depiction will preferably show connections between individual points along the dose response path for each particular stimulus.

Meaningful comparison between related stimuli requires that one identify patterns or trends in various response curves. This may be accomplished with or without the aid of a visualization technique/tool of the type described above. If a human observer is to participate in the pattern recognition, then such a visualization tool will typically provide great assistance. However, if a machine is to do the comparison, the reduced dimensional visualization technique may be unnecessary. In accordance with this invention, important techniques that may be employed for such comparison include techniques that determine an average difference or distance between two potentially related stimulus response curves, clustering, and the like.

Software/Hardware

Certain embodiments of the present invention employ processes acting under control of instructions and/or data stored in or transferred through one or more computer systems. Embodiments of the present invention also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, embodiments of the present invention relate to computer readable media or computer program products that include program instructions and/or data (including data structures) for performing various computer-implemented operations associated with presenting stimulus response signatures and paths, as well as calculating distances therebetween. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine in accordance with this invention. The code may specify input, output, calculations, conditionals, branches, iterative loops, etc.

Figure 6:
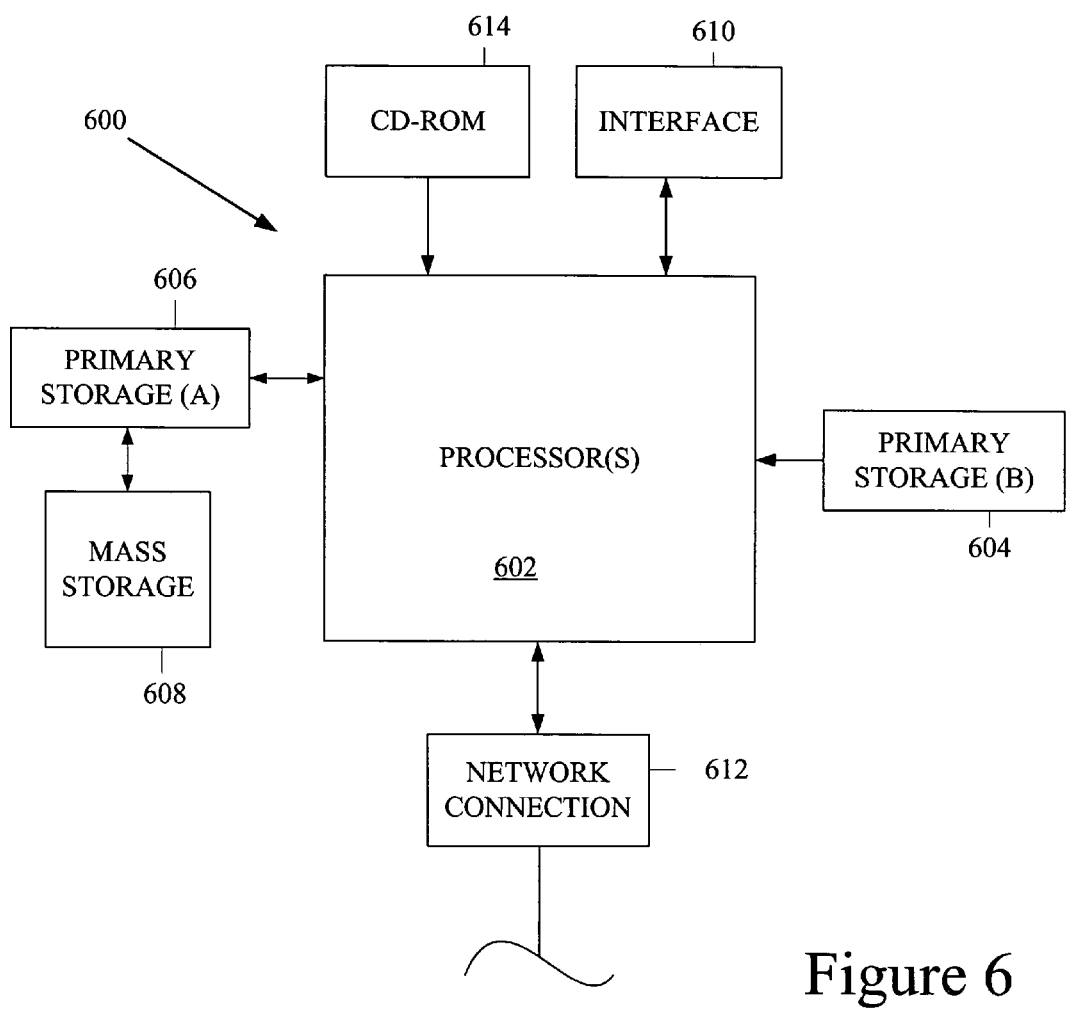
FIG. 6 is a simplified block diagram of a computer system that may be used to implement various aspects of this invention, including calculating distances between response curves.

FIG. 6 illustrates, in simple block format, a typical computer system that, when appropriately configured or designed, can serve as a computational apparatus of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and non-programmable devices such as gate array ASICs or general-purpose microprocessors. In the depicted embodiment, primary storage 604 acts to transfer data and instructions uni-directionally to the CPU and primary storage 606 is used typically to transfer data and instructions in a bi-directional manner. Both of these primary storage devices may include any suitable computer-readable media such as those described above. A mass storage device 608 is also coupled bi-directionally to primary storage 606 and provides additional data storage capacity and may include any of the computer-readable media described above. Mass storage device 608 may be used to store programs, data and the like and is typically a secondary storage medium such as a hard disk. Frequently, such programs, data and the like are temporarily copied to primary memory 606 for execution on CPU 602. It will be appreciated that the information retained within the mass storage device 608, may, in appropriate cases, be incorporated in standard fashion as part of primary storage 604. A specific mass storage device such as a CD-ROM 614 may also pass data uni-directionally to the CPU or primary storage.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

In one embodiment, a system such as computer system 600 is used as a biological classification tool that employs distance or similarity routines for biological data. System 600 may also serve as various other tools associated with biological classification such as a image analyzer and/or image capture tool. Information and programs, including image files and other data files can be provided via a network connection 612 for downloading by a researcher. Alternatively, such information, programs and files can be provided to the researcher on a storage device.

In a specific embodiment, the computer system 600 is directly coupled to an image acquisition system such as an optical imaging system that captures images of cells. Digital images from the image generating system are provided via interface 612 for image analysis by system 600. Alternatively, the images processed by system 600 are provided from an image storage source such as a database or other repository of cell images. Again, the images are provided via interface 612. Once in apparatus 600, a memory device such as primary storage 606 or mass storage 608 buffers or stores, at least temporarily, digital images of the cells. In addition, the memory device may store the quantitative phenotypes that represent the points on the response path. The memory may also store various routines and/or programs for analyzing the presenting the data, including the response paths. Such programs/routines may include programs for performing path comparisons, (e.g., distance or similarity calculations, as well as clustering and classification operations), principal component analysis, regression analyses, and for graphical rendering of the response paths.

Other Embodiments

Although the above has generally described the present invention according to specific processes and apparatus, the present invention has a much broader range of applicability. In particular, the present invention has been described in terms of cellular phenotypes that are derived primarily from image analysis, but is not so limited. Stimulus response curves of this invention may contain data obtained primarily from non-image sources such as expression data and other assay data. Of course, those of ordinary skill in the art will recognize other variations, modifications, and alternatives.

What is claimed is:

1. A method of classifying a stimulus based on its associated stimulus response path in biological feature space, the method comprising:
    (a) applying a stimulus to cells;
    (b) imaging the cells;
    (c) deriving two or more stimulus response oaths from images of the cells;
    (d) aligning two or more of the stimulus response paths on a common radius, r, from a point in biological feature space where a negative control is applied;
    (e) calculating a separation distance, D, between points on two of the stimulus response paths having the common radius, r, from the negative control point; and
    (f) classifying the stimulus of at least one of the stimulus response paths on the basis of the calculated value of the separation distance, D, and providing that classification for a user.

2. The method of claim 1, wherein aligning the two or more stimulus response paths comprises calculating the common radius, r, as a Euclidean distance from the negative control point.

3. The method of claim 1, wherein calculating the separation distance, D, comprises calculating a value based on a spherical geometry including the points sharing the common radius, r, from the negative control point.

4. The method of claim 3, wherein the value based on a spherical geometry comprises an angle or an inner product.

5. The method of claim 1, wherein the stimulus response paths are associated with particular mechanisms of action, and wherein (f) comprises classifying the at least one of the stimulus response paths based on the mechanism of action.

6. The method of claim 1, wherein the stimulus response paths comprise points that define signatures, and wherein the signatures comprise phenotype features of a biological system exposed to stimuli.

7. The method of claim 6, wherein the signatures are obtained by applying varying levels of the stimuli to the biological system.

8. The method of claim 6, wherein the signatures are obtained by monitoring the effect of the stimulus on the biological system over time.

9. The method of claim 6, wherein the biological system is a cell line.

10. The method of claim 1, wherein the stimulus is exposure to a chemical compound.

11. A computer program product comprising a machine readable medium on which is provided program instructions for classifying a stimulus based on its associated stimulus response path in biological feature space, the instructions comprising:
    (a) applying a stimulus to cells;
    (b) imaging the cells;
    (c) deriving two or more stimulus response paths from images of the cells;
    (d) aligning two or more of the stimulus response paths on a common radius, r, from a point in biological feature space where a negative control is applied;
    (e) calculating a separation distance, D, between points on two of the stimulus response paths having the common radius, r, from the negative control point; and
    (f) classifying the stimulus of at least one of the stimulus response paths on the basis of the calculated value of the separation distance, D, and providing that classification for a user.

12. The computer program product of claim 11, wherein instructions for aligning the two or more stimulus response paths comprise instructions for calculating the common radius, r, as a Euclidean distance from the negative control point.

13. The computer program product of claim 11, wherein instructions for calculating the separation distance, D, comprise instructions for calculating a value based on a spherical geometry including the points sharing the common radius, r, from the negative control point.

14. The computer program product of claim 13, wherein the value based on a spherical geometry comprises an angle or an inner product.

15. The computer program product of claim 11, wherein the stimulus response paths are associated with particular mechanisms of action, and wherein (f) comprises instructions for classifying the at least one of the stimulus response paths based on the mechanism of action.

16. The computer program product of claim 11, wherein the stimulus response paths comprise points that define signatures, and wherein the signatures comprise phenotype features of a biological system exposed to stimuli.

* * * * *